(12) United States Patent
van Rooyen et al.

(10) Patent No.: US 11,014,265 B2
(45) Date of Patent: May 25, 2021

(54) METHODS AND APPARATUS FOR ADDITIVELY MANUFACTURING STRUCTURES USING IN SITU FORMED ADDITIVE MANUFACTURING MATERIALS

(71) Applicant: Battelle Energy Alliance, LLC, Idaho Falls, ID (US)

(72) Inventors: Isabella J. van Rooyen, Idaho Falls, ID (US); Clemente J. Parga, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 435 days.

(21) Appl. No.: 15/909,505

(22) Filed: Mar. 1, 2018

(65) Prior Publication Data
US 2018/0264679 A1 Sep. 20, 2018

Related U.S. Application Data

(60) Provisional application No. 62/473,618, filed on Mar. 20, 2017.

(51) Int. Cl.
*B28B 1/00* (2006.01)
*B33Y 10/00* (2015.01)
(Continued)

(52) U.S. Cl.
CPC .............. *B28B 1/001* (2013.01); *B33Y 10/00* (2014.12); *B33Y 70/00* (2014.12); *C01B 33/06* (2013.01);
(Continued)

(58) Field of Classification Search
CPC ... B23K 15/0086; B22F 3/1055; B29C 64/00; B29C 64/20; B28B 1/001
See application file for complete search history.

(56) References Cited

U.S. PATENT DOCUMENTS 3,699,209 A * 10/1972 Ward .................... B01D 53/68
423/240 R
3,850,623 A * 11/1974 Sheller ................ C22B 60/0213
75/399
(Continued)

FOREIGN PATENT DOCUMENTS

CN 102131942 B 6/2013
WO 2015092299 A1 6/2015
(Continued)

OTHER PUBLICATIONS

Saliba-Silva, A. et al. "Fabrication of U3Si2 powder for fuels used in IEA-R1 nuclear research reactor." 2008. Materials Science Forum. 591. (Year: 2008).*

(Continued)

*Primary Examiner* — Nicholas A Wang
(74) *Attorney, Agent, or Firm* — TraskBritt

(57) ABSTRACT

A method of additively manufacturing a structure comprises nuclear reactor comprises disposing a feed material on a surface of a substrate in a reaction vessel, disposing at least one material formulated and configured to react with the feed material in the reaction vessel, and exposing the feed material and the at least one material to energy from an energy source to react the feed material and the at least one material to form an additive manufacturing material and reaction by-products. The additive manufacturing material is separated from the reaction by-products and exposed to energy from the energy source to form inter-granular bonds between particles of the additive manufacturing material and form a layer of a structure comprising the additive manufacturing material. Related apparatuses and methods are disclosed.

13 Claims, 13 Drawing Sheets

(51) Int. Cl.
| | |
|---|---|
| *C01B 33/06* | (2006.01) |
| *G21G 1/02* | (2006.01) |
| *B33Y 70/00* | (2020.01) |
| *G21C 3/42* | (2006.01) |
| *C04B 35/58* | (2006.01) |
| *C04B 35/515* | (2006.01) |
| *G21C 21/02* | (2006.01) |
| *C04B 35/622* | (2006.01) |
| *B33Y 30/00* | (2015.01) |
| *B22F 3/105* | (2006.01) |

(52) U.S. Cl.
CPC .... *C04B 35/5158* (2013.01); *C04B 35/58085* (2013.01); *C04B 35/58092* (2013.01); *C04B 35/622* (2013.01); *G21C 3/42* (2013.01); *G21C 21/02* (2013.01); *G21G 1/02* (2013.01); *B22F 3/1055* (2013.01); *B33Y 30/00* (2014.12); *C04B 2235/3224* (2013.01); *C04B 2235/3227* (2013.01); *C04B 2235/3229* (2013.01); *C04B 2235/3244* (2013.01); *C04B 2235/445* (2013.01); *C04B 2235/6026* (2013.01); *C04B 2235/80* (2013.01)

(56) References Cited

U.S. PATENT DOCUMENTS

| | | | | |
|---|---|---|---|---|
| 5,076,488 | A | * | 12/1991 | Graham ................ C22C 16/00 148/519 |
| 9,330,795 | B2 | | 5/2016 | Picart et al. |
| 9,574,257 | B2 | | 2/2017 | Allenou et al. |
| 2013/0313659 | A1 | | 11/2013 | Takahata et al. |
| 2015/0034604 | A1 | | 2/2015 | Subramanian et al. |
| 2015/0098546 | A1 | | 4/2015 | Xu et al. |
| 2015/0368752 | A1 | * | 12/2015 | Tassios ................... C22B 26/22 75/599 |
| 2016/0247583 | A1 | | 8/2016 | Pappano et al. |
| 2016/0271878 | A1 | * | 9/2016 | Nuechterlein ......... B33Y 10/00 |
| 2016/0358673 | A1 | | 12/2016 | Xu et al. |
| 2017/0045877 | A1 | * | 2/2017 | Shapiro ................ B23K 26/082 |

FOREIGN PATENT DOCUMENTS

| | | | |
|---|---|---|---|
| WO | WO2015092299 | * | 6/2015 |
| WO | 2015175041 | A2 | 11/2015 |
| WO | 2015200257 | A1 | 12/2015 |
| WO | 2016061033 | A1 | 4/2016 |

OTHER PUBLICATIONS

Reznik, B. et al. "Direct conversion of uranium tetrafluoride to uranium carbide." 1963. Final technical report, GTR-62-4571. General Telephone and electronics Lab. (Year: 1963).*

Baroch, C. et al. "Preparation of zirconium from zirconium tetrafluoride." 1956. Iowa state university Ames Laboratory ISC technical reports. 127. (Year: 1956).*

International Search Report from International Application No. PCT/US2018/021045, dated May 17, 2018, 3 pages.

Reznik et al., "Direct conversion of uranium tetrafluoride to uranium carbide", Final Technical Report, GTR-62-4571, Jul. 1, 1961-Jun. 30, 1962. General Telephone and Electronics Labs, Inc., Bayside, NY (US) (May 1963), [retrieved from the Internet on May 1, 2018], ,URL: https://www.osti.gov/servlets/purl/4664310., pp. 6,20.

Sahasrabudhe et al., "Additive Manufacturing of Reactive in Situ Zr Based Ultra-High Temperature Ceramic Composites", Journal of the Minerals, Metals, and Materials Society, vol. 68, No. 3 (Mar. 2016), pp. 822-830.

Saliba-Silva et al., "Fabrication of U3Si2 Powder for Fuels used in IEA-R1 Nuclear Research Reactor", InMaterials Science Forum, Trans Tech Publications, vol. 591 (2008) pp. 194-199.

International Written Opinion of the International Searching Authority for Application No. PCT/US18/21045, dated May 17, 2018, 7 pages.

* cited by examiner

METHODS AND APPARATUS FOR ADDITIVELY MANUFACTURING STRUCTURES USING IN SITU FORMED ADDITIVE MANUFACTURING MATERIALS

PRIORITY CLAIM

This application claims the benefit of the filing date of U.S. Provisional Patent Application Ser. No. 62/473,618, filed Mar. 20, 2017, for "METHODS AND APPARATUS FOR ADDITIVELY MANUFACTURING STRUCTURES USING IN SITU FORMED ADDITIVE MANUFACTURING MATERIALS USING AN ADDITIVE MANUFACTURING PROCESS," the disclosure of which application is hereby incorporated herein in its entirety by reference.

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

FIELD

Embodiments of the disclosure relate generally to additively manufacturing one or more structures using in situ formed additive manufacturing materials. More particularly, embodiments of the disclosure relate to methods and apparatus for directly manufacturing fissile fuel materials and other materials from a raw fuel material and one or more additional reactants in an additive manufacturing process, and to related methods and structures.

BACKGROUND

Fuel blocks, fuel elements, fuel assemblies, and other structures that are used in nuclear reactor cores are generally formed by extrusion or sintering processes. Such processes include preparation of substantially pure powders from which the structures are formed, as well as formation of a die through which the powder will be extruded or in which the powder will be compacted and sintered.

After powder preparation, extrusion includes mixing the powders with a binder material, a resin, a lubricant, or combinations thereof and extruding the mixture through a die having a cross-sectional shape of a final structure. The extruded product (i.e., the extrudate) may then be machined to a desired final size and shape.

Alternatively, structures may be formed by compacting a powder mixture into a mold or die and sintering the powder mixture to form a final structure. Such sintering processes often include adding a resin material, a binder material, or a combination thereof to the powder mixture to facilitate formation of a green structure to be sintered. The resin or binder material may comprise, for example, a high molecular weight material, such as a high molecular weight poly (ethylene oxide), a coal tar pitch (CTP) material, other binder materials, or combinations thereof. After the materials are pressed in the mold, the materials are generally heated under high temperature and high pressure (HTHP) conditions to form inter-granular bonds between individual grains of the powder material.

However, use of the resin materials, the binder materials, or both in sintering or extrusion processes may be undesirable and the presence of such materials in the final structures are considered impurities. For example, resin or binder materials in an extrudate may increase a likelihood of cracking, both on the surface and internally, of the extrudate. Resin and binder materials are frequently outgassed from a sintered structure. The outgassing may form pores in the sintered structure and ultimately reduce a density thereof. In some instances, outgassing may form cracks in the structure.

In addition, forming structures by extrusion or sintering requires the use of substantially pure materials, in the form of a powder. The use of substantially pure materials may increase a cost of forming materials by extrusion or sintering and may reduce the types of materials that may be used in such processes.

BRIEF SUMMARY

Embodiments disclosed herein include structures including a heat pipe integral with a fuel element, modular nuclear reactors, and related methods. For example, in accordance with one embodiment, a method of additively manufacturing a structure comprises disposing a feed material on a surface of a substrate in a reaction vessel, disposing at least one material formulated and configured to react with the feed material in the reaction vessel, exposing the feed material and the at least one material to energy from an energy source to react the feed material and the at least one material to form an additive manufacturing material and reaction by-products, separating the additive manufacturing material from the reaction by-products, and exposing the additive manufacturing material to energy from the energy source to form inter-granular bonds between particles of the additive manufacturing material and form a layer of a structure comprising the additive manufacturing material.

In additional embodiments, a method of additively manufacturing a uranium-containing nuclear fuel material from a uranium material comprises disposing at least one uranium-containing material selected from the group consisting of uranium tetrafluoride, uranium hexafluoride, depleted uranium, uranium dioxide, and uranium oxide ($U_3O_8$) in a reaction vessel to form a first layer of the at least one uranium-containing material in the reaction vessel, disposing at least one reactant material selected from the group consisting of an alkali metal, silicon, a silicon-containing compound, carbon monoxide, water, a lanthanide, an actinide, or a semimetal proximate the at least one uranium-containing material, exposing the at least one uranium-containing material and the at least one reactant material to energy from an energy source to form uranium metal, uranium silicide, or uranium oxide, and exposing the uranium metal, uranium silicide, or uranium oxide to energy from the energy source to form a first layer of a structure.

In further embodiments, a method of additively manufacturing a structure with an in situ formed additive manufacturing material comprises providing a feed material in a reaction vessel, exposing the feed material to energy from an energy source to form an additive manufacturing material to be used in an additive manufacturing process, forming a layer of the additive manufacturing material on a substrate, and exposing the additive manufacturing material to energy from the energy source to form a layer of a structure.

In yet additional embodiments, an apparatus for additively manufacturing a structure using in situ formed additive manufacturing materials comprises a feed conduit configured to dispose a feed material comprising at least one material to be reacted to form an additive manufacturing material on a substrate, and an energy source configured to provide energy to the feed material and react the feed material to form an additive manufacturing material, wherein the energy source is further configured to provide energy to the additive manufacturing material to additively manufacture a structure comprising the additive manufacturing material.

DETAILED DESCRIPTION

Figure 1A:
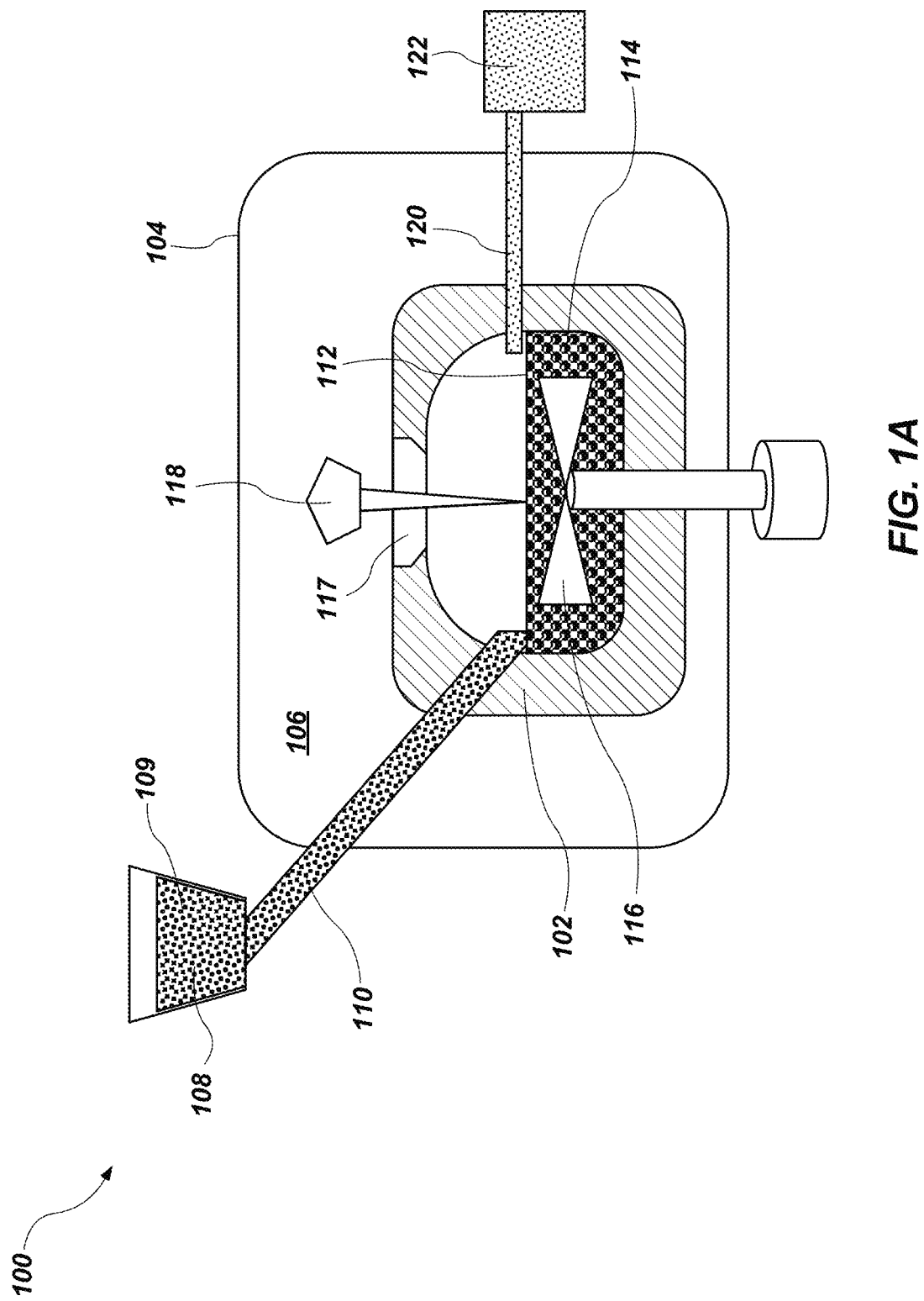
FIG. 1A is a simplified schematic illustrating a system for additively manufacturing a structure with in situ formed additive manufacturing materials, according to embodiments of the disclosure.

Illustrations presented herein are not meant to be actual views of any particular material, component, or system, but are merely idealized representations that are employed to describe embodiments of the disclosure.

The following description provides specific details, such as material types, dimensions, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional fabrication techniques employed in the industry. In addition, the description provided below does not form a complete process flow, apparatus, or system for forming a material with additive manufacturing materials formed in situ, or for forming a nuclear fuel element, a component of a nuclear reactor core, another structure, or related methods. Only those process acts and structures necessary to understand the embodiments of the disclosure are described in detail below. Additional acts to form a material with in situ formed additive manufacturing materials, or to form a nuclear fuel element, a component of a nuclear reactor core, or another structure may be performed by conventional techniques. Further, any drawings accompanying the present application are for illustrative purposes only and, thus, are not drawn to scale. Additionally, elements common between figures may retain the same numerical designation.

According to embodiments described herein, a structure may be additively manufactured from one or more feed materials that are reacted in situ to form a material to be used in the additive manufacturing process. By way of nonlimiting example, a feed material may be provided in a system including a reaction vessel and may be exposed to energy (e.g., laser radiation, an electron beam, etc.) from an energy source to provide sufficient energy to react components of the feed material and form a material suitable for additive manufacturing, such materials being referred to herein for the sake of convenience as "additive manufacturing materials." In other embodiments, at least one reactant material may be added to the feed material prior to exposure of the feed material to the energy from the energy source. Responsive to exposure to the energy, the feed material may react with the at least one reactant material to form an additive manufacturing material. The additive manufacturing material may be disposed on a substrate or a surface of a structure and exposed to energy from the energy source to form a layer of a structure. The process may be repeated until a structure having a desired size and shape is formed. In some embodiments, the reaction vessel may be configured to react at least one of solid feed materials, liquid feed materials, or vapor feed materials.

The systems and related method embodiments disclosed herein may be suitable to form one or more components of a nuclear reactor core including, for example, fuel pellets comprising uranium, uranium dioxide ($UO_2$), uranium oxide ($U_3O_8$), uranium silicide (e.g., $U_3Si_2$, also referred to as uranium sesquisilicide), uranium-molybdenum (U—Mo) alloys, uranium-aluminum (U—Al) alloys (e.g., uranium dispersed in an aluminum matrix material), uranium carbide (UC), neutron reflectors comprising, for example, zirconium sesquisilicide ($Zr_3Si^2$), uranium-zirconium (U—Zr) alloys, uranium-plutonium-zirconium (U—Pt—Zr alloys), uranium-zirconium-palladium (U—Zr—Pd) alloys, uranium-zirconium-palladium-neodymium (U—Zr—Pd—Nd) alloys, uranium-zirconium-palladium-cerium (U—Zr—Pd—Ce) alloys, uranium-zirconium-palladium-praseodymium (U—Zr—Pd—Pr) alloys, uranium-zirconium-palladium-lanthanum (U—Zr—Pd—La) alloys, or other materials. In other embodiments, the systems and related methods may be suitable to form one or more of a sesquisilicide (e.g., thorium sesquisilicide ($Th_3Si_2$), hafnium sesquisilicide ($Hf_3Si_2$), cerium sesquisilicide ($Ce_3Si_2$), etc.), palladium silicide ($PdSi_2$), neodymium silicide ($NdSi_2$), praseodymium silicide ($PrSi_2$), lanthanum silicide ($LaSi_2$), a metal carbide (e.g., zirconium carbide (ZrC), thorium carbide (ThC), hafnium carbide (HfC), cerium carbide ($CeC_2$), plutonium carbide (PuC, $Pu_2C_3$), palladium carbide, neodymium carbide (NdC$_2$), praseodymium carbide (PrC), lanthanum carbide (LaC$_2$), etc.), metal-molybdenum alloys (e.g., zirconium-molybdenum (Zr—Mo) alloys, thorium-molybdenum (Th—Mo) alloys, hafnium-molybdenum (Hf—Mo) alloys, cerium-molybdenum (Ce—Mo) alloys, plutonium-molybdenum (Pu—Mo) alloys, palladium-molybdenum (Pd—Mo) alloys, neodymium-molybdenum (Nd—Mo) alloys, praseodymium-molybdenum (Pr—Nd) alloys, lanthanum-molybdenum (La—Mo) alloys, etc.), metal-aluminum alloys (e.g., zirconium-aluminum (Zr—Al) alloys, thorium-aluminum (Th—Al) alloys, hafnium-aluminum (Hf—Al) alloys, cerium-aluminum (Ce—Al) alloys, plutonium-aluminum (Pu—Al) alloys, palladium-aluminum (Pd—Al) alloys, neodymium-aluminum (Nd—Al) alloys, praseodymium-aluminum (Pr—Al) alloys, lanthanum-aluminum (La—Al) alloys, etc.), or other materials. In some embodiments, the method may include forming a high-grade nuclear fuel from low-grade uranium materials (e.g., uranium tetrafluoride (UF$_4$), uranium hexafluoride (UF$_6$), depleted uranium (e.g., spent uranium oxide, spent uranium dioxide, etc.)).

FIG. 1A is a simplified schematic illustrating a system 100 for additively manufacturing a structure with in situ formed additive manufacturing materials, according to embodiments of the disclosure. In some embodiments, the system 100 comprises a laser engineered net shaping (LENS) tool. In some embodiments, the system 100 may be configured to additively manufacture a material from reactants including solid materials (e.g., powders, granules, etc.). The system 100 may be configured to chemically react one or more feed materials to form one or more materials that may be used to additively manufacture a structure. By way of nonlimiting example, the system 100 may be configured to form one or more nuclear fuel materials (e.g., fuel pellets), one or more components of a nuclear reactor (e.g., a neutron reflector material), a semiconductor material, or other materials. In some embodiments, the system 100 may be configured to form uranium metal, uranium silicide, uranium-molybdenum, uranium dioxide, uranium oxide, highly-enriched uranium oxide, uranium carbide, uranium sesquisilicide, thorium sesquisilicide, hafnium sesquisilicide, cerium sesquisilicide, palladium silicide, neodymium silicide, praseodymium silicide, lanthanum silicide, a uranium-zirconium (U—Zr) alloy, uranium-plutonium-zirconium (U—Pt—Zr alloys), uranium-zirconium-palladium (U—Zr—Pd) alloys, uranium-zirconium-palladium-neodymium (U—Zr—Pd—Nd) alloys, uranium-zirconium-palladium-cerium (U—Zr—Pd—Ce) alloys, uranium-zirconium-palladium-praseodymium (U—Zr—Pd—Pr) alloys, uranium-zirconium-palladium-lanthanum (U—Zr—Pd—La) alloys, or other materials. In some embodiments, the system 100 is configured to form one or more high-grade nuclear fuels (e.g., uranium-containing nuclear fuel materials) from one or more low-grade uranium materials, such as spent uranium fuels.

The system 100 may include a reaction vessel 102 that may be surrounded by an outer enclosure 104. Gases from the reaction vessel 102 may be purged therefrom and disposed in a volume 106 between the reaction vessel 102 and the outer enclosure 104. The volume 106 may be filled with one or more of oxygen, carbon monoxide, carbon dioxide, an inert gas, such as one or more of argon, helium, nitrogen, neon, or another gas, etc., water vapor, or combinations thereof.

In some embodiments, the reaction vessel 102 and the outer enclosure 104 are in fluid communication and exhibit substantially the same pressure. In some embodiments, the reaction vessel 102 may be operated at a pressure less than atmospheric pressure. In some such embodiments, the reaction vessel 102 may be operated under a vacuum. The outer enclosure 104 may be operably coupled to a vacuum configured to control a pressure of the outer enclosure 104 and the reaction vessel 102. In some embodiments, the outer enclosure 104 is operably coupled to a tank or other storage vessel wherein gases within the volume 106 may be collected.

The reaction vessel 102 may be in operable communication with a feed material 108 through a feed conduit 110. The feed material 108 may be contained within a feed tank 109. In some embodiments, the feed material 108 may be provided to the feed tank 109 from a transfer conduit in operable communication with a crushing unit configured to form the powder. The feed conduit 110 may comprise a conveyor, a pipe, a tube, or another means for transporting the feed material 108 from the feed tank 109 to the reaction vessel 102. The feed conduit 110 may be configured to dispose the feed material 108 over at least portions of an upper surface 112 of a structure 114 formed in the reaction vessel 102. In some embodiments, the feed conduit 110 may be configured to dispose the feed material 108 in a desired pattern on the upper surface 112 of the structure 114. In some embodiments, the feed conduit 110 comprises piping or tubing for disposing (e.g., such as by gravity feeding) the feed material 108 to the reaction vessel 102. Although FIG. 1A illustrates the feed material 108 and the feed tank 109 as being disposed outside of the outer enclosure 104, the disclosure is not so limited. In other embodiments, the feed material 108 and the feed tank 109 may be disposed within the volume 106 and the outer enclosure 104.

In some embodiments, the feed material 108 may be provided to the reaction vessel 102 through an atomizer nozzle, which may be configured to heat the feed material 108 as it is provided to the reaction vessel 102. In some embodiments, the feed material 108 is melted as it is provided to the reaction vessel 102.

The feed material 108 may comprise a powder, granules, ore, a solid structure, or a combination thereof. By way of nonlimiting example, the feed material 108 may include particles having at least one dimension (e.g., a diameter) between about 10 μm and about 1 cm, such as between about 10 μm and about 50 μm, between about 50 μm and about 100 μm, between about 100 μm and about 200 μm, between about 200 μm and about 500 μm, between about 500 μm and about 1 mm, between about 1 mm and about 5 mm, or between about 5 mm and about 1 cm.

The feed material 108 may include at least a first component formulated and configured to chemically react with another material. In some embodiments, the first component is formulated and configured to react with at least one reactant material configured to be provided to the reaction vessel 102 to form one or more materials that may be additively manufactured. In other embodiments, the first component may be formulated and configured to react with at least a second component of the feed material 108. Reaction of the first component may form one or more materials that may be used in an additive manufacturing process.

An energy source 118 may be configured to provide a concentrated source of energy (e.g., electromagnetic radiation) to at least portions of the upper surface 112 of the structure 114. In some embodiments, the energy source 118 may comprise a laser, an electron beam emitter, or another tool configured to provide a concentrated form of energy to the reaction vessel.

The energy source 118 may be disposed within the outer enclosure 104 and configured to provide energy through an opening in the reaction vessel 102, or through, for example, a transparent window 117. The transparent window 117 may be transparent to one or more wavelengths of the energy source 118 and may be, in some embodiments, a laser transparent window. In some embodiments, the energy source 118 may be configured to expose the feed material 108 within the reaction vessel 102 (e.g., disposed on the upper surface 112 of the structure 114) to energy. Responsive to exposure to the energy, the first component of the feed material 108 may react with at least one of at least one reactant material and a second component of the feed material 108 to form at least one reaction product having a desired composition that may be used in an additive manufacturing process in the reaction vessel 102.

Reaction of the feed material 108 may form at least one reaction product and at least one reaction by-product. The reaction vessel 102 may include a mixer 116 configured to separate any reaction by-products from the reaction product. In some embodiments, the reaction product exhibits a density, a particle size, another material property, or combinations thereof such that the reaction product physically separates from (e.g., moves below) any reaction by-products responsive to mixing by the mixer 116.

The mixer 116 may include a plurality of mixing blades or an auger. In other embodiments, the mixer 116 may be configured to vibrate the structure 114. The mixer 116 may be configured to facilitate sufficient mixing of feed material 108 to separate reaction products from any reaction by-products. In some embodiments, the mixer 116 may be configured to adequately mix the feed material 108 and expose substantially all surfaces thereof to energy from the energy source 118. In some embodiments, the mixer 116 may be configured to vibrate the reaction products and prior to exposure thereof to the energy from the energy source 118. In some such embodiments, the vibration of the reaction products may increase a number of contact points between particles of the reaction products and may increase a density and decrease a grain size of a resulting structure formed by additive manufacturing.

At least one of the energy source 118 and the structure 114 may be configured to move relative to the other of the energy source 118 and the structure 114. By way of nonlimiting example, at least one of the structure 114 and the energy source 118 may be configured to move in a horizontal direction (e.g., an x-direction, a y-direction, or both), in a vertical direction (e.g., a z-direction), or both. In some embodiments, the structure 114 may be disposed on a movable stage configured to move in one or more directions. In some embodiments, the movable stage may be heated for maintaining a desired temperature of the structure 114.

The system 100 may further include at least one reaction by-product tank 122 configured to receive any reaction by-products formed during the reaction of the feed material 108. The reaction by-products may be provided to the reaction by-product tank 122 through an exit conduit 120.

In some embodiments, the mixer 116 may be configured to mix reaction products and reaction by-products to cause a separation therebetween. The reaction by-products may be removed from the reaction vessel 102 such as through the exit conduit 120. In some embodiments, the reaction products may be removed from the reaction vessel 102 and disposed on a substrate, similar to the system 300 described below with reference to FIG. 3A. In some such embodiments, the mixer 116 may be configured to separate reaction products from reaction by-products and dispose the reaction products on a structure 114 or substrate in a desired pattern. The structure 114 on which the reaction products are disposed may be configured to vibrate to facilitate packing of the reaction products (e.g., the powder of the reaction products) prior to exposure of the reaction products to energy from the energy source 118.

In some embodiments, the system 100 may include a heater configured to heat the feed material 108, the structure 114, or both during use and operation of the system 100.

Figure 1B:
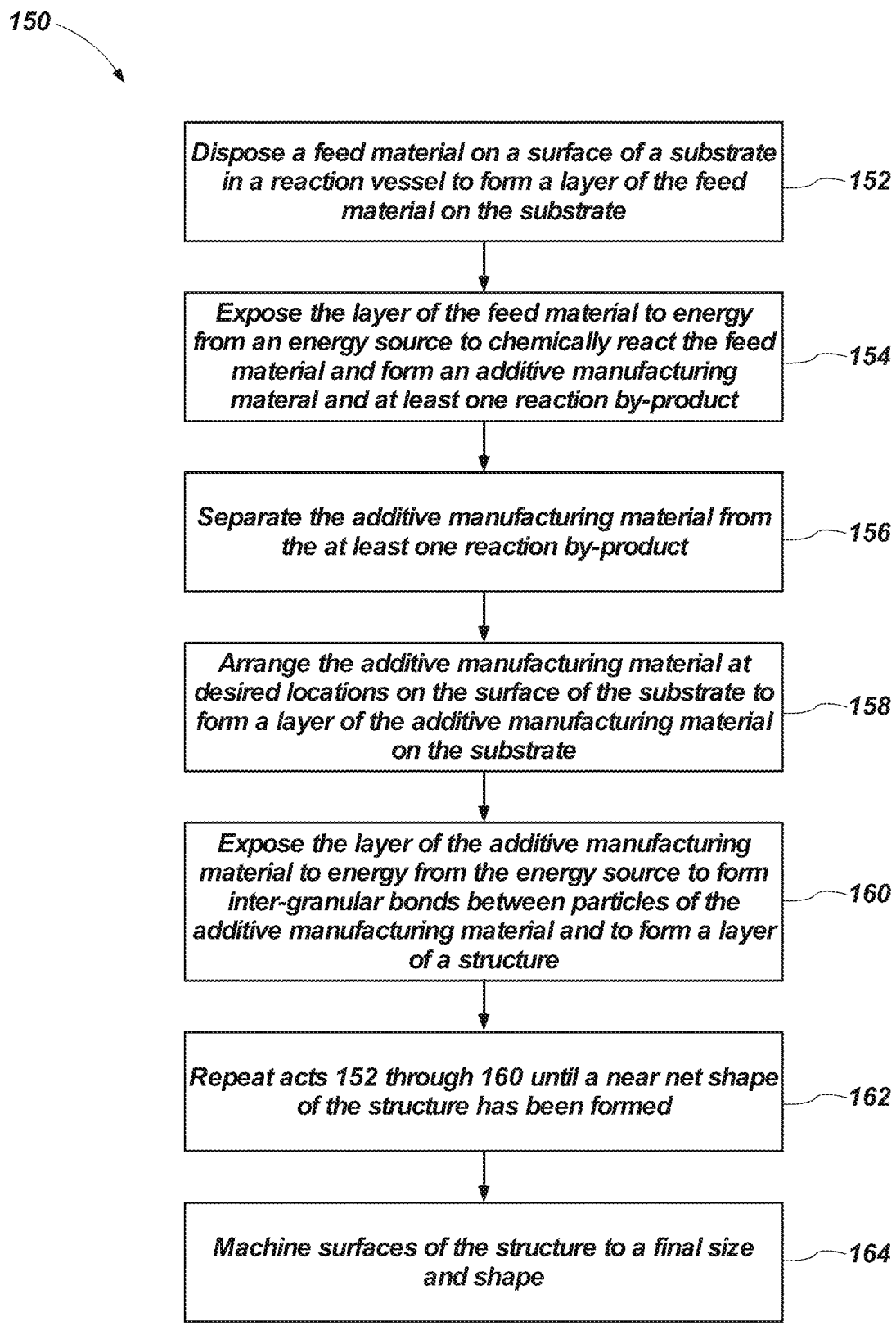
FIG. 1B is a flow diagram illustrating a method of additively manufacturing a material, according to embodiments of the disclosure.

FIG. 1B is a simplified schematic illustrating a method 150 of additively manufacturing a structure in the reaction vessel 102 (FIG. 1A). The method 150 includes act 152 including disposing a feed material on a surface of a substrate in a reaction vessel to form a layer of the feed material on the substrate; act 154 including exposing the layer of the feed material to energy from an energy source to chemically react the feed material and form an additive manufacturing material and at least one reaction by-product; act 156 including separating the additive manufacturing material from the at least one reaction by-product; act 158 including arranging the additive manufacturing material at desired locations on the surface of the substrate to form a layer of the additive manufacturing material on the substrate; act 160 including exposing the layer of the additive manufacturing material to energy from the energy source to form inter-granular bonds between the particles of the additive manufacturing material to form a layer of a structure; act 162 including repeating acts 152 through 160 until a near net shape of the structure has been formed; and act 164 including minor machining of the structure to a final size and shape.

With reference to FIG. 1A and FIG. 1B, act 152 includes disposing the feed material 108 on a surface of a substrate (e.g., on a surface of the structure 114) in the reaction vessel 102 to form a layer of the feed material 108 on the substrate. In some embodiments, the feed material 108 may include at least a first component including a material having at least one element to be incorporated in the structure 114 and at least a second component including a material configured to react with the first component. The second component may be formulated and configured to react with the first component and form a material to be additively manufactured. In some embodiments, the second component may include one or more elements that may be incorporated into the structure 114. In other embodiments, the second component may not include an element to be incorporated into the structure 114.

The first component of the feed material 108 may include a uranium-containing material (e.g., a low-grade uranium material, uranium tetrafluoride, uranium hexafluoride, spent uranium dioxide, spent uranium oxide, unrefined uranium ore, depleted uranium, etc.), a thorium material (e.g., thorium tetrafluoride ($ThF_4$)), a zirconium material (e.g., zirconium tetrafluoride ($ZrF_4$)), a hafnium material (e.g., hafnium tetrafluoride ($HfF_4$)), a cerium material (e.g., cerium tetrafluoride ($CeF_4$)), a plutonium material (e.g., plutonium fluoride ($PuF_3$, $PuF_4$)), a palladium material (e.g., palladium fluoride ($PdF_2$, $PdF_4$)), a neodymium material (e.g., neodymium fluoride ($NdF_3$)), a cerium material (e.g., cerium fluoride ($CeF_3$, $CeF_4$)), a praseodymium material (e.g., praseodymium fluoride ($PrF_3$)), a lanthanum material (e.g., lanthanum fluoride ($LaF_3$)), or combinations thereof. In some embodiments, the first component comprises depleted uranium or another form of uranium conventionally unusable in a nuclear reactor core.

The second component of the feed material 108 may include a material formulated and configured to react with the first component. The second component may include, for example, an alkali metal, a silicon-containing compound, or a combination thereof. The alkali metal may comprise, for example, a material selected from the group consisting of at least one material selected from the group consisting of lithium, sodium, potassium, rubidium, or cesium.

In some embodiments, the second component may be premixed with the first component of the feed material 108 in feed tank 109 prior to disposing the feed material 108 in the reaction vessel 102. In other embodiments, the second component of the feed material 108 may be disposed in the reaction vessel 102 after disposing the first component in the reaction vessel 102.

In some embodiments, the first component may include uranium tetrafluoride ($UF_4$) and the second component may include an alkali metal. The alkali metal and the uranium tetrafluoride may be mixed and provided to the upper surface of the structure to form a layer of the feed material 108 on the substrate.

Act 154 includes exposing the layer of the feed material to energy from the energy source 118 to chemically react the feed material 108 and form an additive manufacturing material and at least one reaction by-product. The energy source 118 may be configured to provide a heat of reaction (e.g., sufficient energy) to initiate a reaction between the first component and the second component of the feed material 108 to form the additive manufacturing material. In some embodiments, the energy source 118 may be configured to provide energy to a localized portion of the feed material 108 on the substrate. Exposing the feed material to the energy may include locally melting the feed material 108 to form a local melt pool of the feed material 108. In some such embodiments, responsive to exposure to the energy, a temperature of the feed material 108 may be at least as high as a melting temperature of the feed material 108.

In embodiments where the first component comprises uranium tetrafluoride or uranium hexafluoride and the second component comprises an alkali metal, responsive to exposure to energy from the energy source 118, the alkali metal may react with the uranium tetrafluoride or the uranium hexafluoride to form the additive manufacturing material (e.g., metallic uranium) and the at least one reaction by-product (e.g., an alkali salt) according to Equations (1) and (2) below, wherein the alkali salt reaction by-product may be in a solid form, liquid form, or gaseous form:

$$UF_4(s)+4X(s) \rightarrow U(s)+4XF(s,l,g) \qquad (1),$$

$$UF_6(s)+6X(s) \rightarrow U(s)+6XF(s,l,g) \qquad (2),$$

wherein X is an alkali metal (e.g., lithium, sodium, potassium, etc.). In some embodiments, the alkali metal comprises sodium and the resulting salt comprises sodium fluoride. In some embodiments, the first component comprises a combination of uranium tetrafluoride and uranium hexafluoride.

Act 156 includes separating the additive manufacturing material from the at least one reaction by-product. In some embodiments, based on a difference in one or more of a density, a particle size, or another material property (e.g., a state of matter, such as solid, liquid, or gaseous) of the reaction by-product and the additive manufacturing material, the reaction by-product may be separated from the additive manufacturing material. The reaction by-product tank 122 may be configured to store the reaction by-products. The reaction vessel 102 may include a scraper configured to scrape the reaction by-products from the upper surface 112 of the structure 114 and mechanically remove the reaction by-products from the structure 114 while the additive manufacturing material may remain on the structure 114. In other embodiments, the reaction vessel 102 may include one or more nozzles configured to provide a pressurized gas stream directed toward the upper surface 112 to separate particles of the reaction by-products from the additive manufacturing material.

Act 158 includes arranging the additive manufacturing material at desired locations on the surface of the substrate to form a layer of the additive manufacturing material on the substrate. The additive manufacturing material may be positioned at desired locations to form a layer of the additive manufacturing material having a desired cross-sectional shape. In some embodiments, the additive manufacturing material may be positioned in locations such that a layer of a fuel pellet may be formed. In some embodiments, arranging the additive manufacturing material at desired locations of the substrate comprises mixing the additive manufacturing material in the reaction vessel 102, such as with the mixer 116. In some embodiments, the reaction vessel 102 may include a grid plate configured to arrange the additive manufacturing material in a desired pattern on the substrate. In some embodiments, the mixer 116 may be configured to vibrate the structure 114 to increase a packing density of the additive manufacturing material prior to exposing the additive manufacturing material to energy from the energy source 118.

Act 160 includes exposing the layer of the additive manufacturing material on the substrate to the energy from the energy source 118 to form inter-granular bonds between particles of the additive manufacturing material and to form a layer of the structure 114. In some embodiments, the layer of the additive manufacturing material may be selectively exposed to the energy to form a layer of the structure 114 having a desired pattern (e.g., cross-sectional shape). In some embodiments, the energy to form inter-granular bonds between particles of the additive manufacturing material and the energy to chemically react the feed material 108 may be different. In some embodiments, the additive manufacturing material may be exposed to a temperature (and an energy) sufficient to cause diffusion and bonding of the additive manufacturing material, which temperature may be less than a melting temperature of the additive manufacturing material. In other embodiments, exposing the additive manufacturing material to the energy may form a local melt pool of the additive manufacturing material.

In some embodiments, the energy applied to form the inter-granular bonds may be greater than the energy applied to chemically react the feed material 108 (such as where the additive manufacturing material exhibits a higher melting temperature than the feed material 108). In other embodiments, the energy applied to initiate the chemical reaction of the feed material 108 may be greater than the energy applied to form inter-granular bonds between particles of the additive manufacturing material (such as where the melting temperature of the feed material 108 is greater than the melting temperature of the additive manufacturing material).

The layer of the structure 114 may be formed to a thickness between about 0.1 mm and about 5.0 mm, such as between about 100 µm and about 200 µm, between about 200 µm and about 500 µm, between about 500 µm and about 1.0 mm, or between about 1.0 mm and about 5.0 mm.

Act 162 includes repeating acts 152 through 160 until a near net shape of the structure 114 has been formed. By way of nonlimiting example, another layer of the feed material 108 may be disposed on the layer of the structure 114 previously formed by additive manufacturing. The another layer of the feed material 108 may be exposed to energy from the energy source 118 in a predetermined pattern or patterns to form reaction by-products and the additive manufacturing material. The reaction by-products may be separated from the additive manufacturing material and removed from the reaction vessel 102. The additive manufacturing material may be arranged at desired locations on the upper surface 112 of the structure 114 to form a layer of the additive manufacturing material on the surface of the structure 114. The additive manufacturing material may be exposed to the energy to form inter-granular bonds between adjacent particles of the additive manufacturing material in the layer of the additive manufacturing material and to form inter-granular bonds between the layer of the additive manufacturing material and the underlying layer of the structure 114. Accordingly, the structure 114 having a desired size and shape may be formed layer by layer by repeating acts 152 through 162.

Act 164 includes minor machining of the structure to a final size and shape. The machining process may include modifying at least one or more dimensions of the structure 114 to form a machined structure exhibiting a desired shape and a desired size. As one nonlimiting example, peripheral portions of the structure may be removed (e.g., ground, etched, etc.) to provide a machined structure exhibiting a diameter and a height suitable for a desired application (e.g., a desired LWR application).

As another example, the machining process may include subjecting the structure 114 to a centerless grinding process to form the machined structure exhibiting a desired diameter and a desired height. In some embodiments, the centerless grinding process includes inserting the structure 114 onto a guide and exposing a portion of a peripheral sidewall of the structure 114, moving and rotating (e.g., spinning) the structure 114 along the guide using a feed wheel, and removing a portion of the peripheral sidewall using a grinding wheel (e.g., a diamond resin grinding wheel) operatively associated with the guide. The grinding wheel may remove (e.g., grind) a portion of the peripheral sidewall of the structure 114 during each pass of the structure 114 across the grinding wheel. The amount of the final structure 114 removed by the grinding wheel during each pass may be controlled to achieve the desired diameter of the machined structure 114. The removal (e.g., grinding) rate of the grinding wheel in terms of a depth of material removed during each pass of the grinding wheel may, for example, be decreased as the desired diameter of the machined structure 114 is approached. After removal of any materials desired to be removed from the structure 114, the structure 114 may be formed to a desired size and a desired shape.

In some embodiments, act 164 may include heat treating the structure. By way of nonlimiting example, the structure may be exposed to annealing conditions, such as temperature greater than about 400° C., greater than about 600° C., greater than about 800° C., greater than about 1,000° C., or even greater than about 1,500° C. for a duration between about one minute and about twenty four hours, such as between about one minute and about thirty minutes, between about thirty minutes and about one hour, between about one hour and about two hours, between about two hours and about four hours, between about four hours and about eight hours, between about eight hours and about twelve hours, or between about twelve hours and about twenty-four hours.

Although the method 150 has been described as forming a uranium material, the disclosure is not so limited. In other embodiments, the method 150 may include reacting a uranium-containing material with a silicon-containing material to form uranium silicide ($U_3Si_2$). In some such embodiments, the first component of the fuel material may include a uranium fluoride, such as uranium tetrafluoride, uranium hexafluoride, or a combination thereof, and the second component of the fuel material may include a silicon-containing material. The silicon-containing material may have the general formula $M_2Si$, wherein M is selected from the group consisting of Zr, Hf, Ta, Ir, Ru, Rh, Co, Ni, Pr, Nd, and Ce; $M_3Si$ and $M_5Si$, wherein M is selected from the group consisting of Cu, V, Cr, Mo, Mn, Fe, and Pt; $M_3Si_2$, wherein M is selected from the group consisting of Hf and Th; a silicon boride (e.g., $SiB_4$, $SiB_6$, etc.); a silicon lanthanide (e.g., LaSi, $La_3Si_2$, $La_5Si_3$, or $La_5Si_4$); or a combination thereof.

In some such embodiments, the uranium-containing material and the silicon-containing material may be exposed to energy from the energy source 118 to cause a chemical reaction between the first component and the second component and form an additive manufacturing material according to Equation (3):

$$UF_4(s) + MSi(s) \rightarrow U_3Si_2(s) + MF_x(s,l,g) \qquad (3),$$

wherein M is the same as described above. Of course, it is contemplated that the compound $MF_x$ above may include a stoichiometric amount of element M for a number of fluorine atoms in the compound.

Accordingly, responsive to exposure to energy from the energy source 118, the feed material 108 may form a uranium silicide additive manufacturing material and a fluoride salt reaction by-product. The resulting uranium silicide may be disposed on the surface of the structure 114 at desired locations and exposed to energy from the energy source 118 to form inter-granular bonds between the surface of the structure 114 and the uranium silicide and form another layer of the structure 114. Accordingly, a structure comprising uranium silicide may be additively manufactured (e.g., layer-by-layer) using feed materials comprising uranium tetrafluoride, uranium hexafluoride, or a combination thereof, and a silicon-containing material.

In other embodiments, it is contemplated that a feed material comprising uranium tetrafluoride or uranium hexafluoride may be reacted with an alkali metal responsive to exposure to energy from the energy source 118 to form uranium metal. A silicon powder may be added to the uranium metal and exposed to energy from the energy source to form uranium silicide. The uranium silicide may be arranged in a desired pattern and exposed to energy from the energy source 118 to form inter-granular bonds between particles of the uranium silicide and form a structure (e.g., a fuel pellet) comprising the uranium silicide. In yet other embodiments, a feed material comprising one of zirconium tetrafluoride, hafnium tetrafluoride, thorium tetrafluoride, cerium tetrafluoride, plutonium fluoride, palladium fluoride, neodymium fluoride, praseodymium fluoride, or lanthanum fluoride may be reacted with an alkali metal responsive to exposure to energy from the energy source 118 to form a metal comprising zirconium, hafnium, thorium, cerium, plutonium, palladium, neodymium, praseodymium, or lanthanum, respectively, according to Equation (4) below:

$$MF_4(s) + 4X(s) \rightarrow M(s) + 4XF(s,l,g) \qquad (4),$$

wherein M is a metal, such as one of zirconium, hafnium, thorium, cerium, plutonium, palladium, neodymium, praseodymium, lanthanum, alloys thereof, or any of the elements described above with reference to Equation (3), and X is an alkali metal.

A silicon powder may be added to the metal and exposed to energy from the energy source to form a metal silicide (e.g., zirconium silicide, hafnium silicide, thorium silicide, cerium silicide, palladium silicide, neodymium silicide, praseodymium silicide, or lanthanum silicide) according to Equation (5) below:

$$M(s) + A\ Si(s) \rightarrow MSi_a(s) \quad (5),$$

wherein A represents a stoichiometric of silicon for the particular metal silicide. The metal silicide may be arranged in a desired pattern and exposed to energy from the energy source 118 to form inter-granular bonds between particles of the metal silicide and form a structure comprising the metal silicide.

In other embodiments, the feed material may include at least one component formulated and configured to form a uranium carbide material, a uranium-molybdenum alloy, or a uranium-aluminum alloy. By way of nonlimiting example, the first component of the feed material may include uranium tetrafluoride, uranium hexafluoride, or a combination thereof and the second component may include a material formulated and configured to remove the fluoride ions from the uranium (e.g., an alkali metal) and form uranium metal. One of molybdenum, aluminum, or a carbon-containing compound (e.g., graphite, carbon black, etc.) may be added to the uranium metal and exposed to energy from the energy source 118 to react the material with the uranium metal and form a uranium-molybdenum alloy, a uranium-aluminum alloy, or uranium carbide, respectively, according to Equations (6) through (8) below:

$$U(s) + Mo(s) \rightarrow UMo(s) \quad (6),$$

$$U(s) + Al(s) \rightarrow UAl(s) \quad (7),$$

$$U(s) + C(s) \rightarrow UC(s) \quad (8).$$

The uranium-molybdenum alloy, the uranium-aluminum alloy, or the uranium carbide may be arranged in a desired pattern and exposed to energy from the energy source to form a layer of a structure. Accordingly, a structure comprising uranium-molybdenum, uranium-aluminum, or uranium carbide may be formed layer-by-layer in an additive manufacturing process.

In some embodiments, the first component of the feed material may include a metal fluoride (e.g., one of zirconium tetrafluoride, hafnium tetrafluoride, thorium tetrafluoride, cerium tetrafluoride, plutonium fluoride, palladium fluoride, neodymium fluoride, cerium fluoride, praseodymium fluoride, lanthanum fluoride, etc.) and may be reacted with a material formulated and configured to remove the fluoride ions from the uranium (e.g., an alkali metal) and form a respective metal (e.g., zirconium, hafnium, thorium, cerium, plutonium, palladium, neodymium, cerium, praseodymium, lanthanum, etc.), as described above with reference to Equation (4). One of molybdenum, aluminum, or a carbon-containing material (e.g., graphite, carbon black, etc.) may be added to the metal and exposed to energy from the energy source 118 to react the material with the metal and form a metal-molybdenum alloy, a metal-aluminum alloy, or a metal carbide, respectively, according to Equations (9) through (11) below:

$$M(s) + Mo(s) \rightarrow M\text{-}Mo(s) \quad (9),$$

$$M(s) + Al(s) \rightarrow M\text{-}Al(s) \quad (10),$$

$$M(s) + C(s) \rightarrow MC(s) \quad (11).$$

wherein M is the metal, M-Mo is a metal-molybdenum alloy, M-Al is a metal-aluminum alloy, and MC is a metal carbide.

In yet other embodiments, the feed material may include one or more of uranium tetrafluoride, uranium hexafluoride, zirconium tetrafluoride, hafnium tetrafluoride, thorium tetrafluoride, cerium tetrafluoride, plutonium fluoride, palladium fluoride, neodymium fluoride, cerium fluoride, praseodymium fluoride, and lanthanum fluoride. In some embodiments, the feed material may be reacted to form one or more metals (e.g., one or more of uranium, zirconium, hafnium, cerium, plutonium, palladium, neodymium, cerium, praseodymium, or lanthanum) or one or more alloys thereof. By way of nonlimiting example, in some embodiments, the feed material may include a mixture of a uranium fluoride (e.g., uranium tetrafluoride, uranium hexafluoride) and zirconium tetrafluoride. Uranium metal and zirconium metal may be formed according to Equations (1) through (3). The uranium metal and the zirconium metal may be exposed to energy from an energy source to form a uranium-zirconium alloy. Similarly, a uranium-plutonium-zirconium alloy may be formed from a feed material comprising a uranium fluoride, a plutonium fluoride, and a zirconium fluoride. In other embodiments, a uranium-zirconium-palladium alloy may be formed from a feed material comprising a uranium fluoride, a zirconium fluoride, and a palladium fluoride. A uranium-zirconium-palladium-neodymium alloy may be formed from a feed material comprising a uranium fluoride, a zirconium fluoride, a palladium fluoride, and a neodymium fluoride. A uranium-zirconium-palladium-cerium alloy may be formed from a feed material comprising a uranium fluoride, a zirconium fluoride, a palladium fluoride, and a cerium fluoride. A uranium-zirconium-palladium-praseodymium alloy may be formed from a feed material comprising a uranium fluoride, a zirconium fluoride, a palladium fluoride, and a praseodymium fluoride. A uranium-zirconium-palladium-lanthanum alloy may be formed from a feed material comprising a uranium fluoride, a zirconium fluoride, a palladium fluoride, and a lanthanum alloy. The weight percent of each component in the alloys may be controlled by the ratio of the respective fluoride in the feed material.

Accordingly, a structure may be formed using a feed material including at least two components. At least one component of the feed material may include at least one element that may be used in an additive manufacturing process. In some embodiments, the second component may also include at least one element that may be used in the additive manufacturing process. Reaction between the first component and the second component may form an additive manufacturing material in situ to be used in an additive manufacturing process. Accordingly, the method 150 includes an integral method of reacting a feed material to form an additive manufacturing material and additively manufacturing a structure with the additive manufacturing material.

Figure 2A:
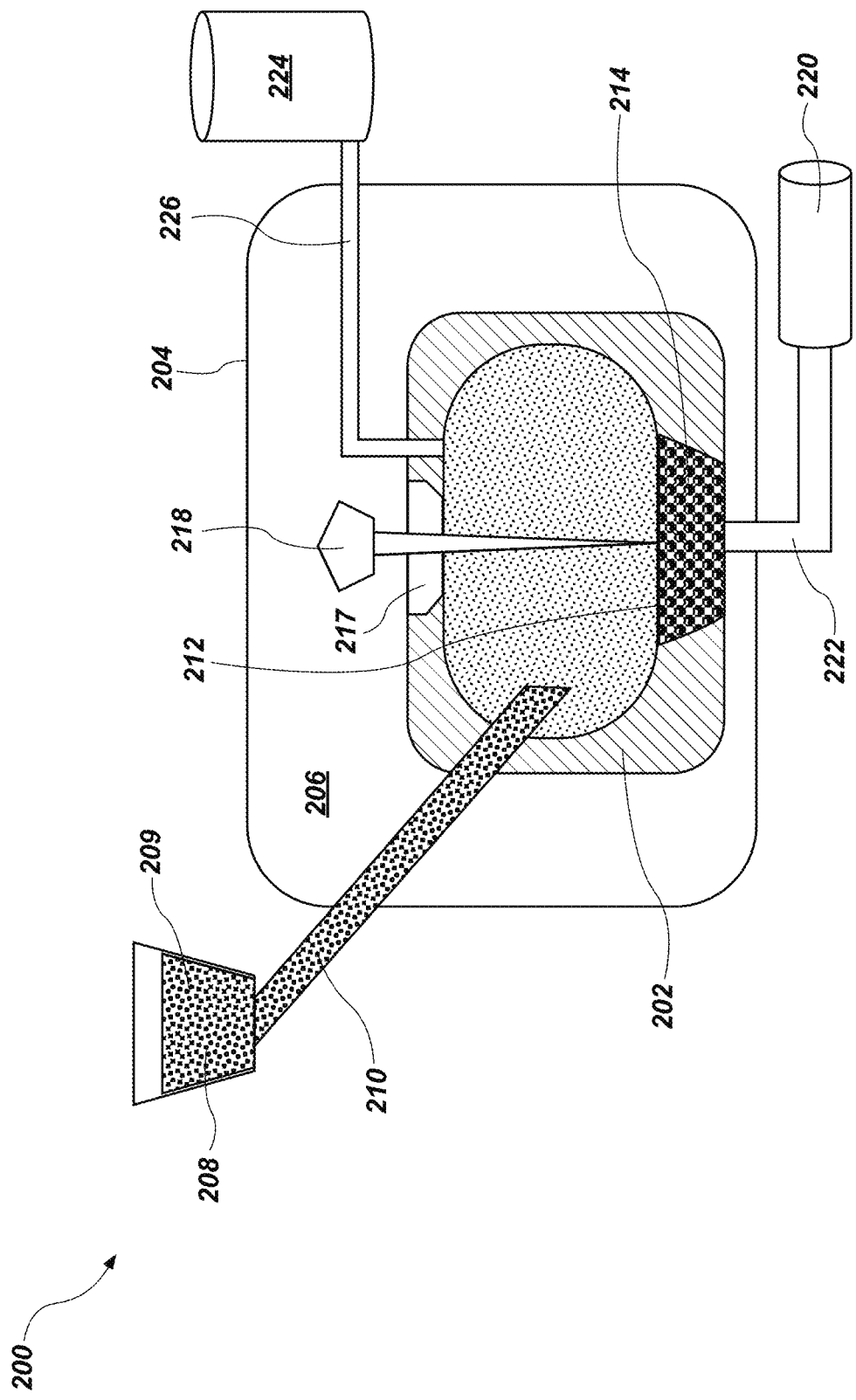
FIG. 2A is a simplified schematic illustrating a system for additively manufacturing a structure with in situ formed additive manufacturing materials, according to other embodiments of the disclosure.

FIG. 2A is a simplified schematic illustrating another system 200 for directly additively manufacturing a structure with in situ formed additive manufacturing materials, according to other embodiments of the disclosure. In some embodiments, the system 200 may be configured to additively manufacture a material from reactants including at least one solid and at least one vapor. The system 200 may include a reaction vessel 202 in which one or more feed materials may be reacted to form an additive manufacturing material to be used in an additive manufacturing process. Gases from the reaction vessel 202 may be purged and disposed in a volume 206 between the reaction vessel 202 and an outer enclosure 204. The volume 206 may be filled with oxygen, carbon monoxide, carbon dioxide, an inert gas, such as one or more of argon, nitrogen, helium, neon, etc., water vapor, or combinations thereof. A pressure of the reaction vessel 202 and the volume 206 may be less than atmospheric (e.g., vacuum), as described above with reference to the reaction vessel 102 and the volume 106 of FIG. 1A.

A feed material 208 may be in communication with the reaction vessel 202 via a feed conduit 210. The feed material 208 may be contained in a feed tank 209. The feed conduit 210 may be configured to dispose the feed material 208 at desired locations within the reaction vessel 202 and on an upper surface 212 of a substrate 214. In some embodiments, the feed material 208 may be provided to the reaction vessel 202 through an atomizer nozzle, which may be configured to heat the feed material 208 as it is provided to the reaction vessel 202. In some embodiments, the feed material 208 is melted as it is provided to the reaction vessel 202. In some embodiments, the feed conduit 210 may be configured with a selectively movable dispensing head to dispose the feed material 208 in a predetermined pattern and at predetermined locations on the upper surface 212. Although FIG. 2A illustrates the feed material 208 and the feed tank 209 as being disposed outside of the outer enclosure 204, the disclosure is not so limited. In other embodiments, the feed material 208 and the feed tank 209 may be disposed within the volume 206 and the outer enclosure 204.

A reactant material 220 may be operably coupled to the reaction vessel 202 via a reactant conduit 222. The reactant conduit 222 may be configured to provide the reactant material 220 to the reaction vessel 202 at predetermined locations. In some embodiments, the reactant conduit 222 may be configured to provide the reactant material 220 through the substrate 214. In some such embodiments, the substrate 214 may comprise a porous material through which the reactant material 220 may pass. Although FIG. 2A illustrates the reactant conduit 222 being located under the substrate 214, the disclosure is not so limited. In other embodiments, the reactant material 220 may be provided to the reaction vessel 202 from a side thereof, a top thereof, or a combination thereof.

An energy source 218 (e.g., a laser, an electron beam emitter, etc.) may be configured to provide energy to the reaction vessel 202. The energy from the energy source 218 may pass through a transparent window 217 and to the substrate 214 in the reaction vessel 202. The energy source 218 may be configured to provide sufficient energy to initiate a reaction between the feed material 208 and the reactant material 220 at predetermined locations on the upper surface 212. In some embodiments, one or both of the energy source 218 and the substrate 214 may be configured to move relative to each other, such as in one or more of an x-direction, a y-direction, and a z-direction.

An outlet conduit 226 may be operatively coupled to the reaction vessel 202 and configured to remove reaction by-products from the reaction vessel 202 to a reaction by-product vessel 224. The reaction by-product vessel 224 may include one or more materials configured to react with a reaction by-product formed in the reaction vessel 202.

In some embodiments, the system 200 may include a heater, a cooler, or both configured to respectively heat or cool the feed material 208, the substrate 214, or both during use and operation of the system 200.

Figure 2B:
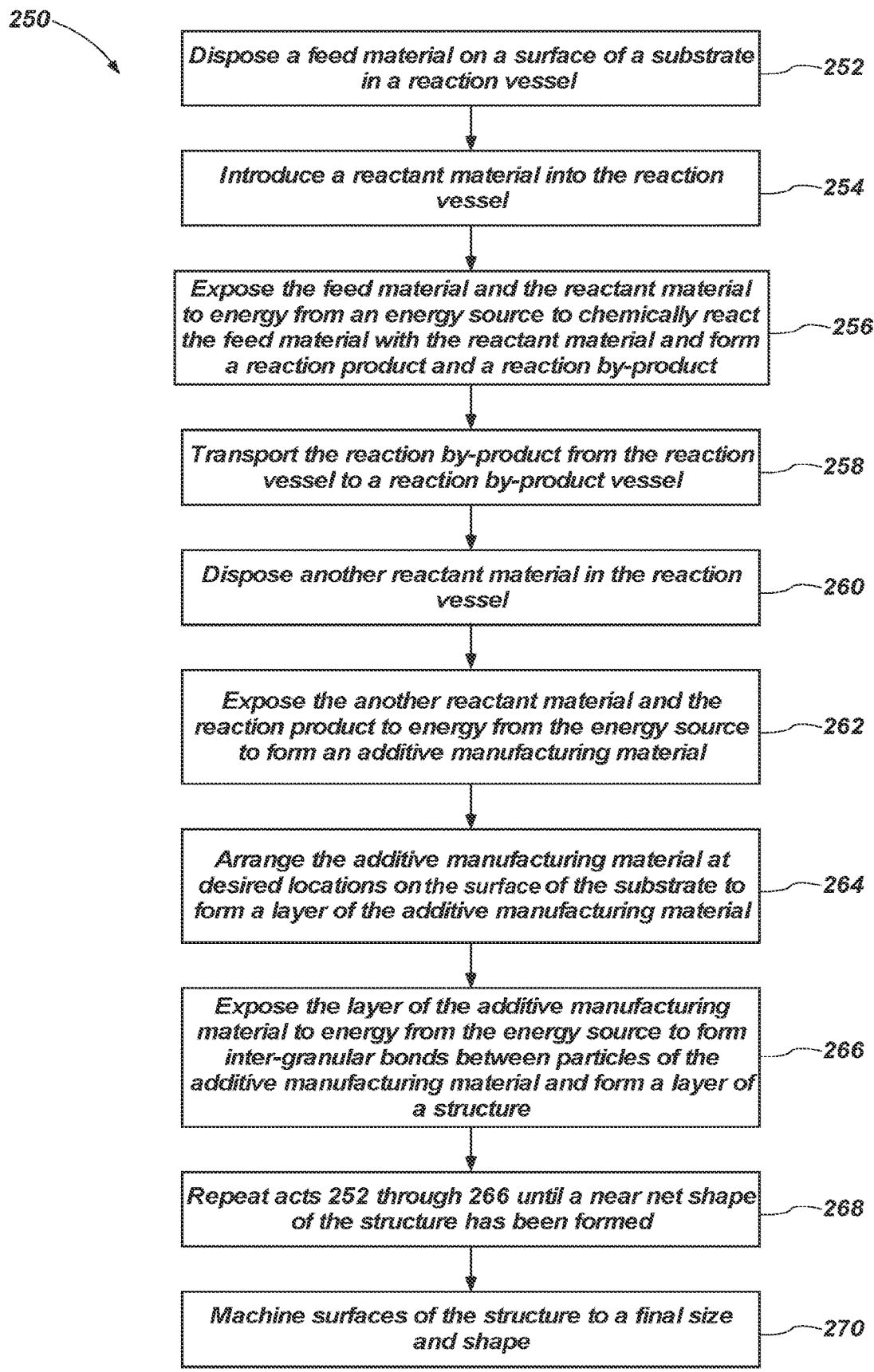
FIG. 2B is a flow diagram illustrating a method of additively manufacturing a material, according to embodiments of the disclosure.

FIG. 2B is a flow diagram of a method 250 of reacting one or more feed materials with a reactant material to form an additive manufacturing material in situ and additively manufacturing a structure from the formed additive manufacturing material, according to embodiments of the disclosure. The method 250 includes act 252 including disposing a feed material on a surface of a substrate in a reaction vessel; act 254 including introducing a reactant material into the reaction vessel; act 256 including exposing the feed material and the reactant material to energy from an energy source to chemically react the feed material with the reactant material and form a reaction product and a reaction by-product; act 258 including transporting the reaction by-product from the reaction vessel to a reaction by-product vessel; act 260 including disposing another reactant material in the reaction vessel; act 262 including exposing the another reactant material and the reaction product to energy from the energy source to form an additive manufacturing material; act 264 including arranging the additive manufacturing material at desired locations on the surface of the substrate to form a layer of the additive manufacturing material; act 266 including exposing the layer of the additive manufacturing material to energy from the energy source to form inter-granular bonds between particles of the additive manufacturing material and form a layer of a structure; act 268 including repeating acts 252 through 266 until a near net shape of the structure has been formed; and act 270 including machining surfaces of the structure to a final size and shape.

With reference to FIG. 2A and FIG. 2B, act 252 includes disposing the feed material 208 on the upper surface 212 of the substrate 214 in the reaction vessel 202. The feed material 208 may include an oxide material, such as uranium dioxide ($UO_2$) or uranium oxide (e.g., $U_3O_8$). The feed material 208 may be disposed in a predetermined pattern on the substrate 214 or an upper surface 212 of a structure (i.e., the structure being additively manufactured) in the reaction vessel 202. The feed material 208 may comprise a powder, granules, an ore, a solid structure, or another material, as described above with reference to the feed material 108 (FIG. 1A).

Act 254 includes introducing a reactant material 220 into the reaction vessel 202. The reactant material 220 may comprise a vapor. The reactant material 220 may be formulated and configured to reduce the feed material 208. In some embodiments, the reactant material 220 comprises carbon monoxide or a mixture of carbon monoxide and carbon dioxide. The reactant material 220 may be introduced into the reaction vessel 202 through the reactant conduit 222 and through the porous substrate 214. In some embodiments, sufficient reactant material 220 may be added to the reaction vessel 202 such that the feed material 208 is in direct contact with the reactant material 220.

Act 256 includes exposing the feed material 208 and the reactant material 220 to energy from the energy source 218 to chemically react the feed material 208 with the reactant material 220 and form a reaction product and at least a reaction by-product. In some embodiments, the feed material 208 may be exposed to the energy from the energy source 218 in the presence of the reactant material 220. The energy source 218 may be substantially the same as the energy source 118 described above with reference to FIG. 1A and FIG. 1B and may be configured to provide concentrated energy to the upper surface 212 of the substrate 214 to initiate a reaction between the feed material 208 and the reactant material 220. Responsive to exposure to the energy, the feed material 208 and the reactant material 220 may react according to the following equations, where the feed material 208 comprises $UO_2$ and $U_3O_8$, respectively.

$$UO_2(s)+2CO(g)\rightarrow U(s)+2CO_2(g) \qquad (12),$$

$$U_3O_8(s)+8CO(g)\rightarrow 3U(s)+8CO_2(g) \qquad (13).$$

In some embodiments, a pressure of the reaction vessel 202 may be less than atmospheric pressure (i.e., vacuum pressure) when the feed material 208 and the reactant material 220 are exposed to the energy.

Act 258 includes transporting (e.g., removing) the reaction by-product from the reaction vessel 202 to the reaction by-product vessel 224. In some embodiments, the reaction by-product may be transported to the reaction by-product vessel 224 through the outlet conduit 226. The reaction by-product vessel 224 may include a vacuum system configured to remove the reaction by-product from the reaction vessel 202. The reaction by-product vessel 224 may include a material formulated and configured to react with the reaction by-product. By way of nonlimiting example, the reaction by-product vessel 224 may include a solution of calcium hydroxide ($Ca(OH)_2$), also referred to in the art as "lime milk" or "limewater." In some embodiments, the reaction by-product vessel 224 comprises a bubbler wherein the reaction by-product (e.g., carbon dioxide gas) passes through a liquid volume contained within the reaction by-product vessel 224 to provide sufficient contact between the reaction by-product and the liquid. The reaction by-product may react with the liquid in the reaction by-product vessel 224, such as, for example, according to Equation (14) below:

$$Ca(OH)_2(aq) + CO_2(g) \rightarrow CaCO_3(s) + H_2O(l,g) \tag{14}$$

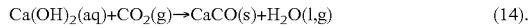

Reacting the reaction by-product in the reaction by-product vessel 224 may reduce emission of undesired reaction by-products (e.g., may reduce emissions of carbon dioxide).

Act 260 includes disposing another reactant material in the reaction vessel 202. In some embodiments, the another reactant material may be formulated and configured to react with the reaction product formed during act 256. The another reactant material may be disposed on the upper surface 212 of the substrate 214 after forming the reaction product by reaction of the feed material 208 and the reactant material 220. Accordingly, the system 200 may include at least another reactant conduit configured to dispose the another reactant material proximate the reaction product in the reaction vessel 202.

The another reactant material may include a silicon-containing material. In some embodiments, the silicon-containing material comprises silicon. In some embodiments, a stoichiometric amount of the silicon-containing material may be added to react with the reaction product. In other embodiments, the silicon-containing material comprises silicon dioxide ($SiO_2$). In some such embodiments, the silicon dioxide may be reduced be exposing the silicon dioxide to the reactant material (e.g., CO) as shown in Equation (15) below.

$$SiO_2(s) + 2CO(g) \rightarrow 2Si(s) + 2CO_2(g) \tag{15}$$

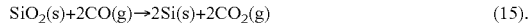

After reducing the silicon dioxide, the silicon may be mixed with the reaction product in the reaction vessel 202.

In some embodiments, the method 250 may include performing act 260 substantially concurrently with act 258. In some such embodiments, as the reaction by-product is transported from the reaction vessel 202, the another reactant material may be disposed in the reaction vessel 202 proximate the reaction product.

Act 262 includes exposing the another reactant material and the reaction product to energy from the energy source 218 to react the another reactant material and the reaction product and form an additive manufacturing material. By way of nonlimiting example, reaction of the reaction product and the another reactant material may form uranium silicide, according to Equation (16) below:

$$3U(s) + 2Si(s) \rightarrow U_3Si_2 \tag{16}$$

In other embodiments, the another reactant material may include at least one of a carbon-containing material, aluminum, or molybdenum. Exposing the reaction product and the another reactant material to energy from the energy source 218 may form uranium carbide, a uranium-aluminum alloy, or a uranium-molybdenum alloy, respectively, similar to Equations (6) through (8) described above.

Act 264 includes arranging the additive manufacturing material at desired locations on the surface of the substrate 214 to form a layer of the additive manufacturing material on the substrate 214. The additive manufacturing material may be arranged in a predetermined pattern to corresponding to a cross-sectional shape of a layer of a structure to be formed. In other embodiments, the additive manufacturing material may be arranged as a blanket layer on the surface of the substrate 214.

Act 266 includes exposing the additive manufacturing material to energy from the energy source 218 to form inter-granular bonds between adjacent particles of the additive manufacturing material and form a layer of a structure. In some embodiments, the energy source 218 may be configured to expose predetermined portions of the layer of the additive manufacturing material to the energy to form a structure having a desired cross-sectional shape. In some embodiments, the energy applied to form the inter-granular bonds between particles of the additive manufacturing material in act 266 and the energy applied to react the feed material and the reactant material in act 256 may be different. Similarly, the energy applied to react the another reactant material and the reaction product in act 262 may be different from the energy applied in act 266. In some embodiments, the energy applied in act 256 and 262 may be less than the energy applied in act 266. In other embodiments, the energy applied in act 256 and act 262 may be greater than the energy applied in act 266.

Act 268 includes repeating acts 262 through 266 until a near net shape of the structure has been formed. By way of nonlimiting example, another layer of the feed material 208 may be disposed on the layer of the substrate 214 previously formed. The reactant material 220 may be introduced into the reaction vessel 202 and the feed material 208 may be exposed to energy from the energy source 218 to react the reactant material 220 with the feed material 208 and form at least a reaction product and a reaction by-product. The reaction by-product may be transported from the reaction vessel 202 to the reaction by-product vessel 224. Another reactant material may be disposed in the reaction vessel 202 and the another reactant material and the reaction product may be reacted responsive to exposure to energy from the energy source 218 to form an additive manufacturing material. The additive manufacturing material may be arranged in a desired pattern on the upper surface 212 of the substrate 214 and exposed energy from the energy source 218 to form inter-granular bonds between particles of the additive manufacturing and the underlying layer of the substrate 214 previously formed. Accordingly, a structure having a desired size and shape may be formed layer by layer by repeating acts 252 through 266.

Act 270 includes machining surfaces of the structure to a final size and shape and may be substantially similar to act 164 described above with reference to FIG. 1B.

In some embodiments, act 270 may include heat treating the structure. By way of nonlimiting example, the structure may be exposed to annealing conditions, such as temperature greater than about 400° C., greater than about 600° C., greater than about 800° C., greater than about 1,000° C., or even greater than about 1,500° C. for a duration between about one minute and about twenty-four hours, such as between about one minute and about thirty minutes, between about thirty minutes and about one hour, between about one hour and about two hours, between about two hours and about four hours, between about four hours and about eight hours, between about eight hours and about twelve hours, or between about twelve hours and about twenty-four hours.

Although the method 250 has been described as including a feed material comprising uranium dioxide, uranium oxide, or a combination thereof, the disclosure is not so limited. In other embodiments, the feed material may include uranium tetrafluoride, uranium hexafluoride, or a combination thereof. In some such embodiments, the reactant material 220 may include a material formulated and configured to react with the uranium tetrafluoride or uranium hexafluoride to form uranium dioxide. In some embodiments, the reactant material 220 comprises steam (i.e., $H_2O$ (g)). Responsive to exposure to the energy from the energy source 218, the feed material 208 and the reactant material 220 may react according to Equation (17) and Equation (18) below:

$$UF_4(s)+2H_2O(g) \rightarrow UO_2(s)+4HF(l,g) \qquad (17),$$

$$2UF_6(g)+6H_2O(g) \rightarrow 2UO_2(s)+12HF(l,g)+O_2(g) \qquad (18).$$

The hydrofluoric acid (HF) vapor may be removed from the reaction vessel 202 through the outlet conduit 226 and may react with the calcium hydroxide in the reaction by-product vessel 224, according to Equation (19) below:

$$Ca(OH)_2(s)+2HF(g) \rightarrow CaF_2(s)+2H_2O(l,g) \qquad (19).$$

In some embodiments, the uranium dioxide formed in the reaction vessel 202 may be reduced by exposing the uranium dioxide to a reducing gas, such as carbon monoxide to form solid uranium, as described above with reference to Equation (12).

A stoichiometric amount of silicon may be added to the uranium in the reaction vessel 202. The uranium and the silicon may be exposed to energy to form uranium silicide, as described above with reference to Equation (16). The uranium silicide may be arranged in a desired pattern on the upper surface 212 and exposed to the energy from the energy source 218 to form inter-granular bonds between adjacent particles of the uranium silicide and the underlying structure. Accordingly, uranium silicide may be arranged in a desired pattern to form a structure (e.g., a fuel pellet) having a desired size and shape.

Although FIG. 2A and FIG. 2B have been described as a system and method for forming uranium silicide, the disclosure is not so limited. In other embodiments, the system and method may be used to form a metal silicide (e.g., one or more of zirconium silicide, hafnium silicide, thorium silicide, cerium silicide, plutonium oxide ($PuO_4$), palladium oxide (PdO), neodymium oxide ($Nd_2O_3$), praseodymium oxide ($Pr_2O_3$), lanthanum oxide ($La_2O_3$), etc.). In some such embodiments, a metal oxide may be reduced by reacting with carbon monoxide to form a metal, according to Equation 20 below:

$$M_yO_x(s,l,g)+XCO(g) \rightarrow YM(s,l)+XCO_2(g) \qquad (20),$$

wherein M is a metal (e.g., zirconium, hafnium, thorium, cerium, plutonium, palladium, neodymium, praseodymium, lanthanum, etc.), X represents a stoichiometric of oxygen for the particular metal oxide, and y represents a stoichiometric amount of the metal.

Silicon powder may be added to the metal and the metal and silicon may be exposed to energy from the energy source 218 to form a respective metal silicide. The metal silicide may be arranged and exposed to energy from the energy source 218 to additively manufacture a structure comprising one or more metal silicide (e.g., one or more of zirconium silicide, hafnium silicide, thorium silicide, cerium silicide, palladium silicide, neodymium silicide, praseodymium silicide, etc.). In other embodiments, a carbon-containing material, aluminum, or molybdenum may be added to the metal to form a carbide, a metal-aluminum alloy, or a metal-molybdenum alloy as described above with reference to Equations (9) through (11).

In some embodiments, rather than uranium tetrafluoride, a fluoride of one or more of zirconium, hafnium, thorium, cerium, plutonium, palladium, neodymium, praseodymium, or lanthanum may be used as a feed material to form the respective material (e.g., one or more of zirconium, hafnium, thorium, cerium, plutonium, palladium, neodymium, praseodymium, or lanthanum) similar to Equation (17) and Equation (18) above. In further embodiments, the another reactant material may include at least one of a carbon-containing material, aluminum, or molybdenum to form a respective carbide, aluminum alloy, or molybdenum alloy. Exposing the formed metal (i.e., of one or more of zirconium, hafnium, thorium, cerium, plutonium, palladium, neodymium, praseodymium, or lanthanum) and the another reactant material to energy from the energy source 218 may form a metal carbide, a metal-aluminum alloy, or a metal-molybdenum alloy, respectively, similar to Equations (6) through (8) described above, wherein uranium is replaced with the metal.

Figure 3A:
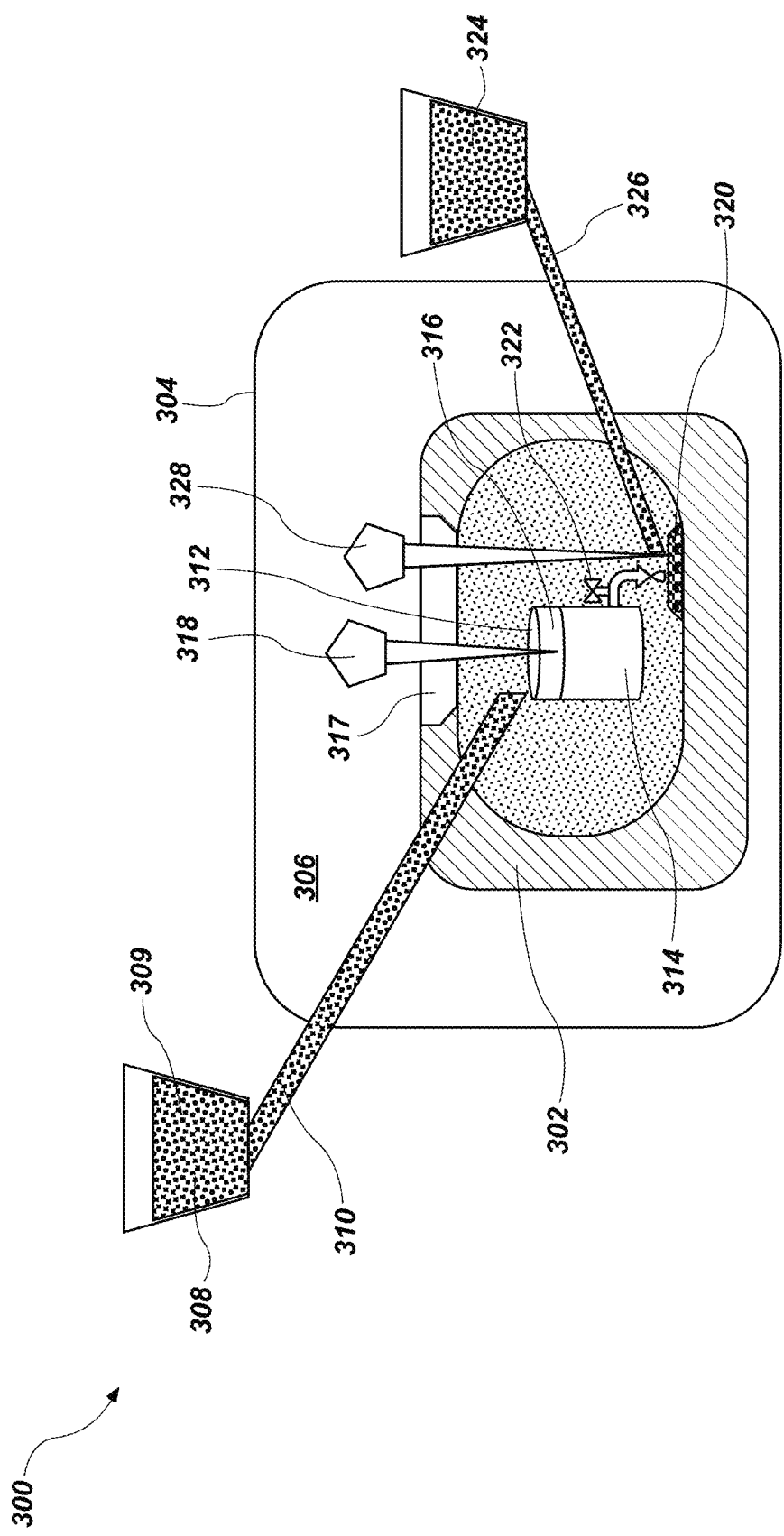
FIG. 3A is a simplified schematic illustrating a system for additively manufacturing a structure with in situ formed additive manufacturing materials, according to yet other embodiments of the disclosure.

FIG. 3A is a simplified schematic illustrating a system 300 for additively manufacturing a structure with in situ formed additive manufacturing materials, according to yet other embodiments of the disclosure. In some embodiments, the system 300 may be configured to additively manufacture a material using solid and liquid reactants. The system 300 may include a reaction vessel 302 substantially surrounded by an outer enclosure 304. A volume 306 between the outer enclosure 304 and the reaction vessel 302 may be filled with a gas, such as oxygen, carbon monoxide, carbon dioxide, an inert gas (e.g., argon, nitrogen, helium, neon, etc.), water, or a combination thereof. A pressure of the reaction vessel 302 and the volume 306 may be less than atmospheric (e.g., vacuum), as described above with reference to the reaction vessel 102 and the volume 106 of FIG. 1A.

A feed material 308 may be contained within a feed tank 309 and in operable communication with the reaction vessel 302 via a feed conduit 310. The feed conduit 310 may be configured to dispose the feed material 308 on an upper surface of a reaction tank 312. In some embodiments, the feed material 308 may be provided to the reaction vessel 302 through an atomizer nozzle, which may be configured to heat the feed material 308 as it is provided to the reaction vessel 302. In some embodiments, the feed material 308 is melted as it is provided to the reaction vessel 302.

In some embodiments, the reaction tank 312 includes a stirrer configured to stir the materials within the reaction tank 312. Although FIG. 3A illustrates the feed material 308 and the feed tank 309 as being disposed outside of the outer enclosure 304, the disclosure is not so limited. In other embodiments, the feed material 308 and the feed tank 309 may be disposed within the volume 306 and the outer enclosure 304.

An energy source 318 (e.g., a laser, an electron beam, etc.) may be configured to provide sufficient energy to initiate a reaction between components of the feed material 308 in the reaction tank 312. In some embodiments, energy from the energy source 318 may be provided to the feed material 308 through a transparent window 317, which may comprise, for example, a laser transparent window. In some embodiments, the energy source 318 may be configured to melt the feed material 308 and cause a reaction between components thereof. Reaction of the components of the feed material 308 may form liquid reaction by-products that may separate from each other based on a difference in density, solubility, or both. A first liquid 316 (e.g., a less dense liquid) may comprise a reaction by-product and may be referred to herein as a floating slag reaction by-product. The first liquid 316 may be skimmed from the top of the reaction tank 312 or otherwise removed or purged therefrom.

A second liquid 314 may comprise a reaction product of the reaction between the components of the feed material 308. The second liquid 314 may be fed from a lower portion of the reaction tank 312 to a substrate 320. A valve 322 may control a flow rate of the second liquid 314 from the reaction tank 312 to the substrate 320. In some embodiments, the valve 322 may be configured to provide the second liquid 314 to the substrate 320 in the form of individual droplets. The substrate 320 may be configured to move in one or more directions such that the second liquid 314 is continuously disposed on a fresh portion of the substrate 320.

A reactant conduit 326 may be configured to dispose a reactant material 324 on the substrate 320. The reactant conduit 326 may be configured to provide sufficient reactant material 324 on or proximate each drop of the second liquid 314 on the substrate 320. The reactant material 324 may be formulated and configured to react with the second liquid 314 to form a material to be additively manufactured to form a structure. In some embodiments, the reactant conduit 326 may be configured to move relative to the substrate 320. By way of nonlimiting example, in some embodiments, the substrate 320 may be disposed on a movable table or stage configured to move the substrate 320 relative to the reactant conduit 326.

A second energy source 328 may be configured to direct sufficient energy to the substrate 320 to initiate a reaction between the second liquid 314 and the reactant material 324 and form an additive manufacturing material. The second energy source 328 may be configured to provide sufficient energy (e.g., heat) to maintain a temperature of the second liquid 314 on the substrate 320 such that the second liquid 314 remains in a liquid phase. In some embodiments, after forming the additive manufacturing material, adjacent portions of the additive manufacturing material may be exposed to energy from the second energy source 328 to additively manufacture a structure including the additive manufacturing material.

In some embodiments, the system 300 may include a heater, a cooler, or both configured to respectively heat or cool the feed material 308, the reaction tank 312, the substrate 320, or combinations thereof during use and operation of the system 300.

Figure 3B:
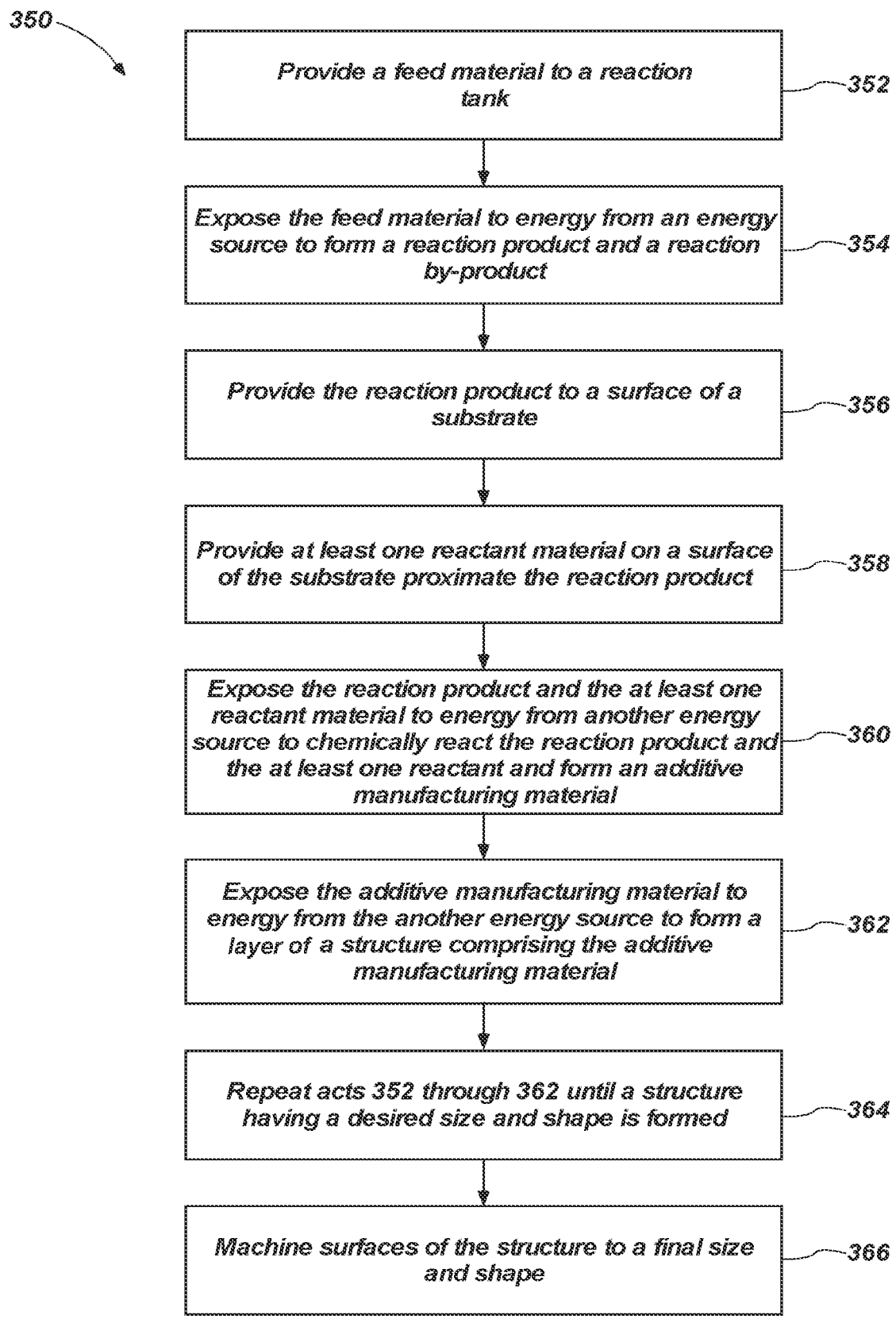
FIG. 3B is a flow diagram illustrating a method of additively manufacturing a material, according to embodiments of the disclosure.

FIG. 3B is a simplified schematic illustrating a flow diagram of a method 350 of additively manufacturing a structure, according to embodiments of the disclosure. The method 350 includes act 352 including providing a feed material to a reaction tank; act 354 including exposing the feed material to energy from an energy source to form a reaction product and a reaction by-product; act 356 including providing the reaction product to a surface of a substrate; act 358 including providing at least one reactant material on a surface of the substrate proximate the reaction product; act 360 including exposing the reaction product and the at least one reactant material to energy from another energy source to chemically react the at least one reactant material and the reaction product and form an additive manufacturing material; act 362 including exposing the additive manufacturing material to energy from the another energy source to form a layer of a structure comprising the additive manufacturing material; act 364 including repeating acts 352 through 362 until a structure having a desired size and shape is formed; and act 366 including machining surfaces of the structure to a final size and shape.

With reference to FIG. 3A and FIG. 3B, act 352 includes providing the feed material 308 to the reaction tank 312. The feed material 308 may include a first component selected from the group consisting of uranium tetrafluoride, uranium hexafluoride, a metal fluoride (e.g., zirconium tetrafluoride, hafnium tetrafluoride, thorium tetrafluoride, cerium tetrafluoride, plutonium fluoride, palladium fluoride, neodymium fluoride, cerium fluoride, praseodymium fluoride, or lanthanum fluoride, etc.), and combinations thereof and a second component selected from the group consisting of one or more lanthanides (e.g., La, Ce, Pr, Nd, Sm, Eu, Gd, Tb, etc.), one or more semimetals (e.g., Al, B, Si, Ge, As, Sb, Te, Po), and one or more actinides (e.g., Ac, Th, Pa, Np, Pu, etc.). As described above with reference to the feed material 108 (FIG. 1A), the feed material 308 may be in the form of a powder, granules, an ore, a solid material, or another structure.

Act 354 includes exposing the feed material 308 to energy from the energy source 318 to form a reaction product and a reaction by-product. By way of nonlimiting example, where the feed material comprises uranium tetrafluoride, uranium hexafluoride, zirconium tetrafluoride, hafnium tetrafluoride, thorium tetrafluoride, cerium tetrafluoride, plutonium fluoride, palladium fluoride, neodymium fluoride, cerium fluoride, praseodymium fluoride, or lanthanum fluoride exposure of the feed material to the energy may initiate the following reactions according to Equations (21) through (23).

$$UF_4(s) + X(s,g) \rightarrow U(l) + XF_w(s,l,g) \quad (21),$$

$$MF_4(s) + X(s,g) \rightarrow M(l) + XF_w(s,l,g) \quad (22),$$

$$UF_6(s) + X(s,g) \rightarrow U(l) + XF_w(s,l,g) \quad (23),$$

wherein M is one of an actinide, a lanthanide, or a metal (e.g., one or more of zirconium, hafnium, thorium, cerium, plutonium, palladium, neodymium, cerium, praseodymium, lanthanum, etc.), X is one of a lanthanide, a semimetal, a transition metal (e.g., titanium, vanadium, chromium, manganese, iron, cobalt, nickel, zirconium, niobium, ruthenium, rhodium, palladium, silver, hafnium, tantalum, tungsten, osmium, iridium, platinum, gold, etc.), or an actinide and w is a suitable number corresponding to a stoichiometric number of fluorine atoms in the reaction by-product. In some embodiments, element X may be more electropositive than element M. In some embodiments, w may be between equal to 3 or 4.

The reaction by-product (i.e., $XF_w$) may be removed from the reaction tank 312 and stored, reacted with another material, or otherwise removed from the reaction vessel 302. In some embodiments, $XF_w$ may include $A_1F_3$, $LaF_3$, $CeF_3$, another trifluoride, $SiF_4$, etc. In some embodiments, the reaction by-product may be useful in another system. In some embodiments, where the $XF_w$ comprises $CeF_3$, the $CeF_3$ may be used to reduce uranium tetrafluoride or uranium hexafluoride to form elemental uranium. In some embodiments, an overflow from the reaction vessel 302 may be captured in an overflow tank configured to retain the reaction by-product.

Act 356 includes providing the reaction product to a surface of the substrate 320. In some embodiments, the reaction tank 312 may be maintained at a temperature such that the reaction product is in a liquid phase. The reaction product may be provided to the substrate 320 through the valve 322. In some embodiments, the reaction product is provided to the substrate 320 as individual droplets.

Act 358 includes providing at least one reactant material on a surface of the substrate 320 proximate the reaction product. The at least one reactant material may include at least one of silicon, molybdenum, aluminum, and a carbon-containing material (e.g., one or more of graphite, carbon black, etc.).

Act 360 includes exposing the reaction product and the at least one reactant material to energy from the another energy source 328 to chemically react the reaction product and the at least one reactant and form an additive manufacturing material. The another energy source 328 may be configured to maintain the reaction product in a liquid phase on the substrate 320. Responsive to exposure to the energy from the another energy source 328, the at least one reactant material and the reaction product may react to form an additive manufacturing material, according to Equations (24) through (29) below.

$$3U(l)+2Si(s)\rightarrow U_3Si_2(s) \quad (24),$$

$$U(l)+Mo(s)\rightarrow Mo\text{—}U(s) \quad (25),$$

$$U(l)+Al(s)\rightarrow U\text{—}Al(s) \quad (26),$$

$$U(l)+C(s)\rightarrow UC(s) \quad (27),$$

$$AM(s,l)+D\ Q(s,l)\rightarrow M_aQ_D(s,l) \quad (28),$$

$$M(s,l)+Q(s,l)\rightarrow Q\text{-}M(s,l) \quad (29),$$

wherein Mo—U and U—Al are uranium-molybdenum and uranium-aluminum alloys, M is one of an actinide, a lanthanide, or a metal (e.g., at least one of zirconium, hafnium, thorium, cerium, plutonium, palladium, neodymium, praseodymium, lanthanum, aluminum, molybdenum, another metal, etc.), Q is one of silicon, molybdenum, aluminum, and a carbon-containing material (e.g., one or more of graphite, carbon black, etc.), Q-M is an alloy, and A and D are suitable numbers corresponding to a stoichiometric number of M and Q atoms in the reaction product. The reaction product may include a stoichiometric amount of each of molybdenum, aluminum, Q, and M.

Act 362 includes exposing the additive manufacturing material to energy from the another energy source 328 to form a layer of a structure comprising the additive manufacturing material. In some embodiments, the energy from the another energy source 328 may be sufficient to heat the additive manufacturing material and form inter-granular bonds between adjacent particles of the additive manufacturing material.

Act 364 includes repeating acts 352 through 362 until a structure having a desired size and shape is formed. By way of nonlimiting example, act 364 may include providing the feed material 308 to the reaction tank 312, exposing the feed material 308 to energy from the energy source 318 to form a reaction product, providing the reaction product and the at least one reactant to the substrate 320 (e.g., on a surface of the structure previously formed by additive manufacturing), exposing the reaction product and the at least one reactant to energy from the second energy source 328 to form an additive manufacturing material, and exposing the additive manufacturing material to energy from the second energy source 328 to form another layer of the structure on the previously formed layer of the structure.

Of course, it is contemplated that the system 300 may be configured to operate continuously and each act may be performed simultaneously. For example, the feed material 308 may be disposed in the reaction tank 312 at substantially the same time as the additive manufacturing material (i.e., the second liquid 314) is disposed on the substrate 320. Similarly, the feed material 308 in the reaction tank 312 may be exposed to energy at substantially the same time as the additive manufacturing material is exposed to energy from the second energy source 328.

Act 366 includes machining surfaces of the structure to a final size and shape and may be substantially similar to act 164 described above with reference to FIG. 1B. Accordingly, a structure may be additively manufactured by reacting a plurality of feed materials to form an additive manufacturing material in situ and exposing the additive manufacturing material to energy to form a layer of a structure.

In some embodiments, act 366 may include heat treating the structure. By way of nonlimiting example, the structure may be exposed to annealing conditions, such as temperature greater than about 400° C., greater than about 600° C., greater than about 800° C., greater than about 1,000° C., or even greater than about 1,500° C. for a duration between about one minute and about twenty-four hours, such as between about one minute and about thirty minutes, between about thirty minutes and about one hour, between about one hour and about two hours, between about two hours and about four hours, between about four hours and about eight hours, between about eight hours and about twelve hours, or between about twelve hours and about twenty-four hours.

In some embodiments, an alloyed structure may be formed by using a predetermined ratio of feed materials. For example, a mixture of metal fluorides may be reduced to a mixture of metals, as described above with reference to Equation (22), wherein the mixture of metals comprises the same atomic percent of metals as the ratio of the metals in the feed material mixture. The mixture of metals may be mixed with at least one reactant material and exposed to energy, as described above with reference to Equation (28) to form a structure.

Figure 4A:
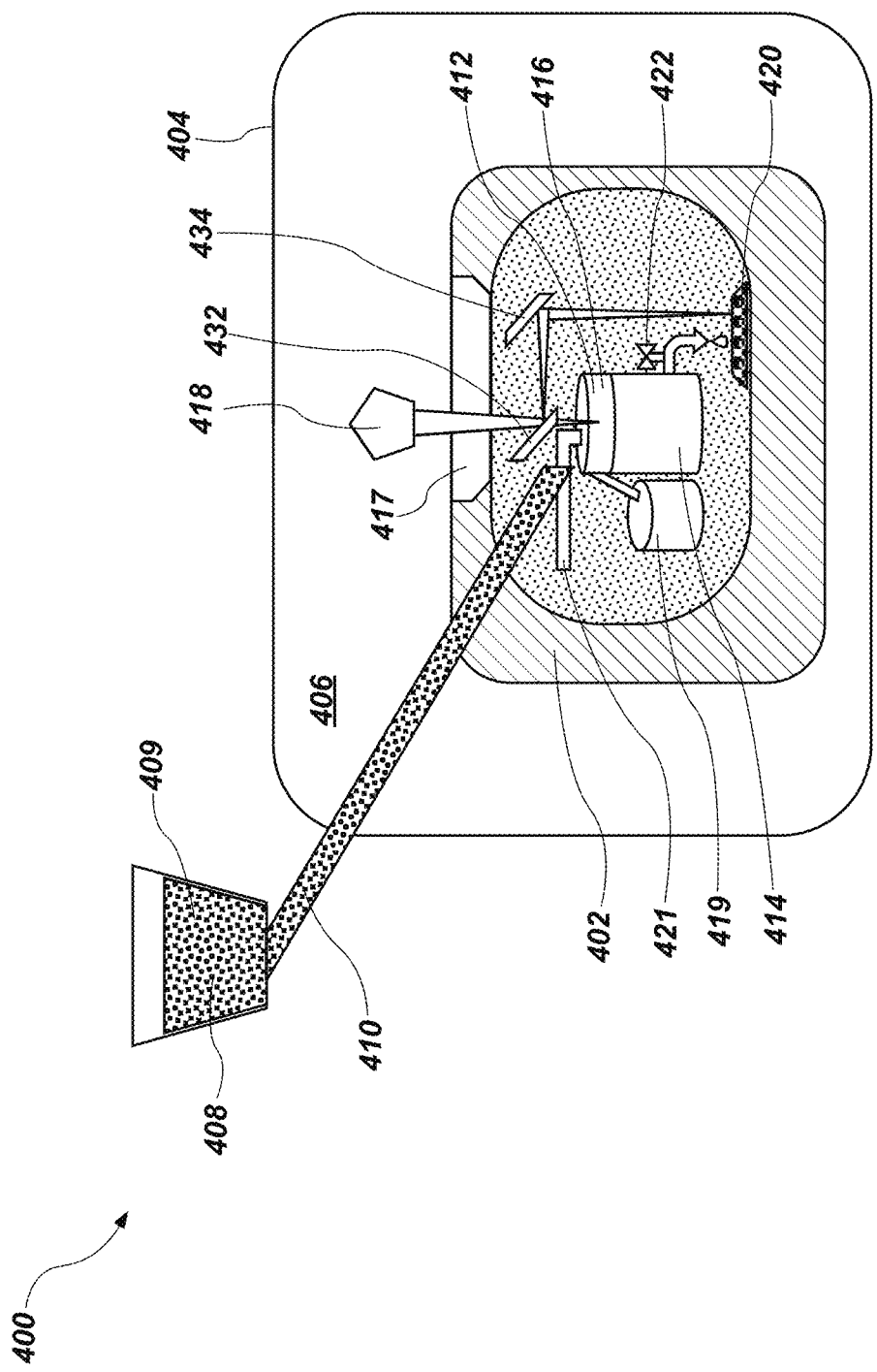
FIG. 4A is a simplified schematic illustrating a system for additively manufacturing a structure with in situ formed additive manufacturing materials, according to additional embodiments of the disclosure.

FIG. 4A is a simplified schematic illustrating a system 400 for additively, manufacturing a structure with in situ formed additive manufacturing materials, according to additional embodiments of the disclosure. The system 400 may include a reaction vessel 402 surrounded by an outer enclosure 404. A volume 406 between the outer enclosure 404 and the reaction vessel 402 may be filled with a gas, such as with oxygen, carbon monoxide, carbon dioxide, an inert gas (e.g., argon, nitrogen, helium, neon, etc.), water, or combinations thereof. A pressure of the reaction vessel 402 and the volume 406 may be less than atmospheric (e.g., vacuum), as described above with reference to the reaction vessel 102 and the volume 106 of FIG. 1A.

A feed material 408 may be contained within a feed tank 409 and in operable communication with the reaction vessel 402 via a feed conduit 410. The feed conduit 410 may be configured to dispose the feed material 408 on an upper surface of a reaction tank 412. In some embodiments, the feed material 408 may be provided to the reaction vessel 402 through an atomizer nozzle, which may be configured to heat the feed material 408 as it is provided to the reaction vessel 402. In some embodiments, the feed material 408 is melted as it is provided to the reaction vessel 402.

In some embodiments, the reaction tank 412 includes a stirrer configured to stir the materials within the reaction tank 412. Although FIG. 1A illustrates the feed material 408 and the feed tank 409 as being disposed outside of the outer enclosure 404, the disclosure is not so limited. In other embodiments, the feed material 408 and the feed tank 409 may be disposed within the volume 406 and the outer enclosure 404.

An energy source 418 (e.g., a laser, an electron beam, etc.) may be configured to provide sufficient energy to initiate a reaction between components of the feed material 408 in the reaction tank 412. The energy from the energy source 418 may be provided to the feed material 408 through a transparent window 417, which may comprise a laser transparent window. Reaction of the components of the feed material 408 may form at least one liquid reaction product and at least one liquid reaction by-product. The reaction product and the reaction by-product may separate from each other based on a difference in solubility, a difference in density, a difference in at least another property, or combinations thereof. A first liquid 416 (e.g., a less dense liquid) may comprise a reaction by-product and may be referred to herein as a floating slag. The first liquid 416 may overflow the reaction tank 412 into a reaction by-product tank 419. In some embodiments, a skimmer 421 may be configured to skim an upper surface of the reaction tank 412 and direct the reaction first liquid 416 to the reaction by-product tank 419. The first liquid 416 may be removed from the reaction by-product tank 419 and stored or reacted in another process.

A second liquid 414 may comprise the reaction product. The second liquid 414 may be fed from a lower portion of the reaction tank 412 to a substrate 420. A valve 422 may control a flow rate of the second liquid 414 from the reaction tank 412 to the substrate 420. In some embodiments, the valve 422 may be configured to provide the second liquid 414 to the substrate 420 in the form of individual droplets. The substrate 420 may be configured to move such that the second liquid 414 is continuously disposed on a fresh portion of the substrate 420. By way of nonlimiting example, in some embodiments, the substrate 420 may be disposed on a movable table or stage configured to move the substrate 420 relative to the reaction tank 412.

The energy source 418 may be configured to transmit energy to a set of mirrors. A first mirror 432 may be configured to transmit energy from the energy source 418 to a surface of the reaction tank 412. The first mirror 432 may further be configured and positioned to transmit at least a portion of the energy to a second mirror 434, which may be configured and positioned to direct the energy toward a surface of the substrate 420. In some such embodiments, the surface of the reaction tank 412 may be exposed to the energy substantially at the same time as the surface of the substrate 420 is exposed to the energy.

Responsive to exposure to the energy from the energy source, the second liquid 414 on the substrate 420 may form a layer of a structure comprising inter-granular bonds between adjacent particles of the second liquid.

In some embodiments, the system 400 may include a heater, a cooler, or both configured to respectively heat or cool the feed material 408, the reaction tank 412, the substrate 420, or combinations thereof during use and operation of the system 400.

Figure 4B:
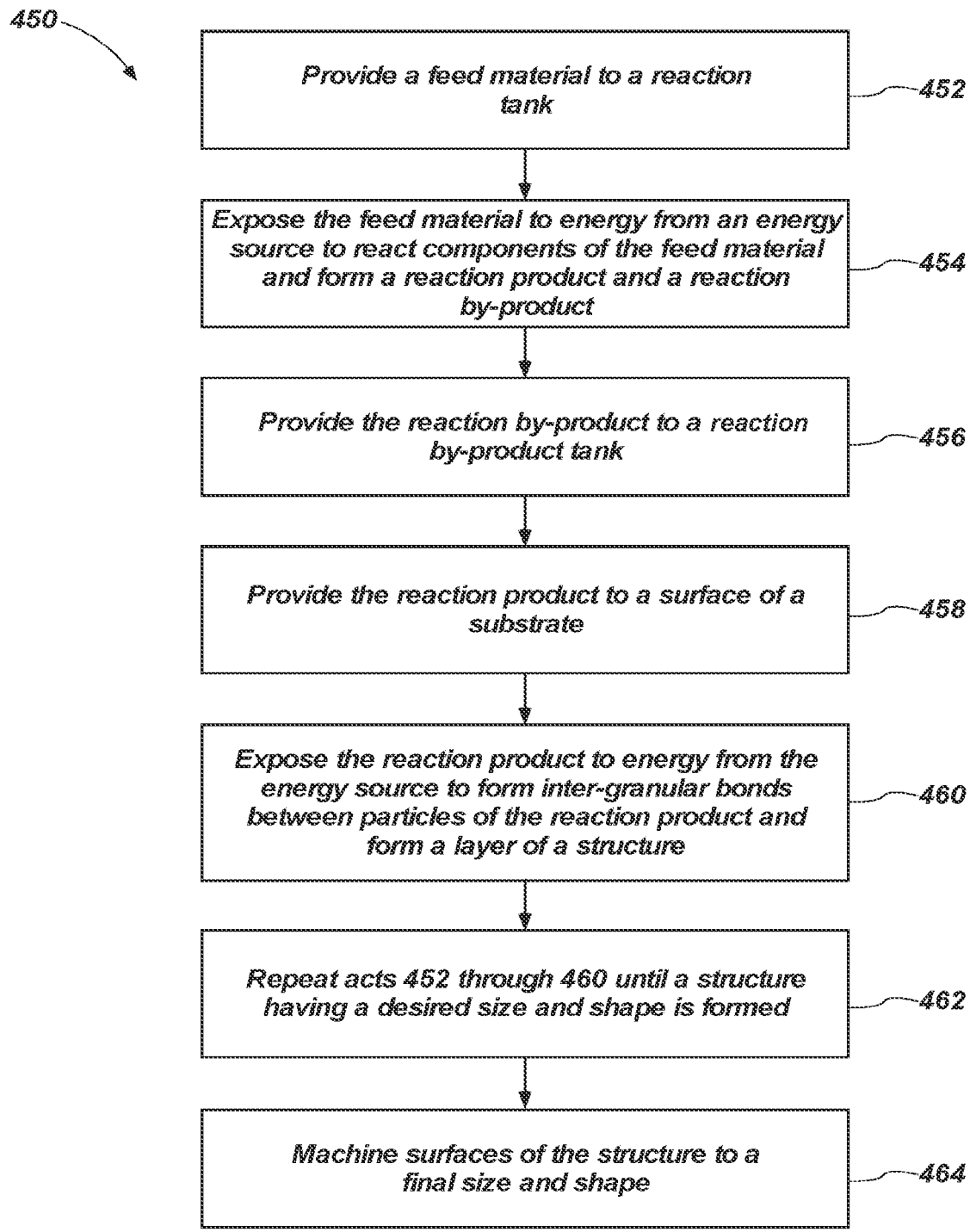
FIG. 4B is a flow diagram illustrating a method of additively manufacturing a material, according to embodiments of the disclosure.

FIG. 4B is a simplified schematic illustrating a flow diagram of a method 450 of additively manufacturing a structure, according to embodiments of the disclosure. The method 450 includes act 452 including providing a feed material to a reaction tank; act 454 including exposing the feed material to energy from an energy source to react components of the feed material and form a reaction product and a reaction by-product; act 456 including providing the reaction by-product to a reaction by-product tank; act 458 including providing the reaction product to a surface of a substrate; act 460 including exposing the reaction product to energy from the energy source to form inter-granular bonds between particles of the reaction product and form a layer of a structure; act 462 including repeating acts 452 through 460 until a structure having a desired size and shape is formed; and act 464 including machining surfaces of the structure to a final size and shape.

With reference to FIG. 4A and FIG. 4B, act 452 includes providing the feed material 408 to the reaction tank 412. The feed material 408 may include a first component including at least one of uranium tetrafluoride, uranium hexafluoride, a metal fluoride (e.g., a metal fluoride, such as one or more of zirconium tetrafluoride, hafnium tetrafluoride, thorium tetrafluoride, cerium tetrafluoride, plutonium fluoride, palladium fluoride, neodymium fluoride, cerium fluoride, praseodymium fluoride, lanthanum fluoride), uranium oxide, uranium dioxide, and a metal oxide (e.g., zirconium oxide ($ZrO_2$), hafnium oxide ($HfO_2$), thorium oxide ($ThO_2$), cerium oxide ($CeO_2$, $Ce_2O_3$, $Ce_3O_4$), plutonium oxide ($PuO_2$), palladium oxide (PdO), neodymium oxide ($Nd_2O_3$), praseodymium oxide ($Pr_2O_3$), lanthanum oxide ($La_2O_3$), and a second component including at least one of silicon, molybdenum, aluminum, and a carbon-containing material (e.g., graphite, carbon black, etc.).

Act 454 includes exposing the feed material 408 to energy from the energy source 418 to react components of the feed material 408 and form a reaction product and a reaction by-product. Responsive to exposure to energy from the energy source 418, the first component and the second component of the feed material 408 may react with each other to form the reaction product and the reaction by-product. By way of nonlimiting example, exposure to the energy may form uranium silicide, a uranium aluminide-aluminum alloy according to Equations (30) and (33) below:

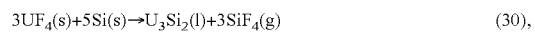
$$3UF_4(s)+5Si(s) \rightarrow U_3Si_2(l)+3SiF_4(g) \quad (30),$$

$$6UF_6(g)+21Si(s) \rightarrow 6U_3Si_2(s,l)+9SiF_4(g) \quad (31),$$

$$3UF_4(s)+16Al(s) \rightarrow 3UAl_3(s,l)+3Al(s,l)+4AlF_3(s,l) \quad (32),$$

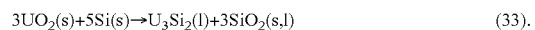
$$3UO_2(s)+5Si(s) \rightarrow U_3Si_2(l)+3SiO_2(s,l) \quad (33).$$

Of course, in other embodiments, uranium tetrafluoride in Equations (30) through (32) may be replaced with other metal fluorides to form a metal silicide or metal-aluminum alloy. By way of nonlimiting example, zirconium tetrafluoride may be reacted with silicon to form $Zr_3Si_2$ and $SiF_4$. In other embodiments, the fluoride may comprise hafnium tetrafluoride, thorium tetrafluoride, cerium tetrafluoride, plutonium fluoride, palladium fluoride, neodymium fluoride, praseodymium fluoride, or lanthanum fluoride. Similarly, silicon may be replaced with one of molybdenum, aluminum, or a carbon-containing material to form a respective molybdenum alloy, aluminum alloy, or carbide. In addition, uranium dioxide in Equation (33) may be replaced with uranium oxide or another metal oxide.

Act 456 includes providing the reaction by-product to the reaction by-product tank 419. In some embodiments, the reaction by-product may overflow from the reaction tank 412 and into the reaction by-product tank 419. In some embodiments, the skimmer 421 may skim an upper surface of the reaction tank 412 and direct the reaction by-product to the reaction by-product tank 419. In some embodiments, any gaseous reaction by-products may be removed from the reaction vessel 402 by means that would be understood by those of ordinary skill in the art.

Act 458 includes providing the reaction product to a surface of the substrate 420. The reaction product may be provided to the surface of the substrate 420 through the valve 422. In some embodiments, the reaction product may be provided in the form of individual droplets. The reaction product may be provided in a predetermined pattern on the surface of the substrate 420. In some embodiments, the substrate 420 comprises a movable stage configured to move as the reaction product is disposed thereon.

Act 460 includes exposing the reaction product to energy from the energy source to form inter-granular bonds between particles of the reaction product and form a layer of a structure on the substrate. In some embodiments, responsive to being disposed on the substrate 420, the reaction product may cool and solidify. Responsive to exposure to energy from the energy source 418, particles of the reaction product may form inter-granular bonds with adjacent particles to form a layer of a structure. The energy source 418 may be configured to move relative to the substrate 420 to expose a predetermined pattern of the reaction product to the energy.

Act 462 includes repeating acts 452 through 460 until a structure having a desired size and shape is formed. By way of nonlimiting example, act 462 may include providing the feed material 408 in the reaction tank 412, exposing the feed material 408 to energy from the energy source 418 to react components of the feed material 408 and form a reaction product and a reaction by-product, providing the reaction by-product in the reaction by-product tank 419, providing the reaction product to the substrate 420 (e.g., over previously formed layers of the structure), and exposing the reaction product to energy from the energy source 418 to form inter-granular bonds between the reaction product and underlying layers of the structure.

In some embodiments, substantially all acts of the method 450 may be performed simultaneously. By way of nonlimiting example, the first mirror 432 and the second mirror 434 may be positioned and configured to direct energy from the energy source 418 to the reaction tank 412 and to the substrate 420 simultaneously. Accordingly, fresh feed material 408 may be continuously provided to the reaction tank 412, while the feed material 408 in the reaction tank 412 is exposed to the energy. At the same time, the second liquid 414 may be substantially continuously provided to the substrate 420 and exposed to the energy from the energy source 418. Although the method 450 has been described as including the first mirror 432 and the second mirror 434, the disclosure is not so limited. In other embodiments, the method 450 may include use of a first energy source 318 and a second energy source 328, as described above with reference to FIG. 3A.

Act 464 includes machining surfaces of the structure to a final size and shape and may be substantially similar to act 164 described above with reference to FIG. 1B. Accordingly, a structure may be additively manufactured by reacting a plurality of feed materials to form an additive manufacturing material in situ and exposing the additive manufacturing material to energy to form a layer of a structure.

In some embodiments, act 464 may include heat treating the structure. By way of nonlimiting example, the structure may be exposed to annealing conditions, such as temperature greater than about 400° C., greater than about 600° C., greater than about 800° C., greater than about 1,000° C., or even greater than about 1,500° C. for a duration between about one minute and about twenty-four hours, such as between about one minute and about thirty minutes, between about thirty minutes and about one hour, between about one hour and about two hours, between about two hours and about four hours, between about four hours and about eight hours, between about eight hours and about twelve hours, or between about twelve hours and about twenty-four hours.

Figure 5A:
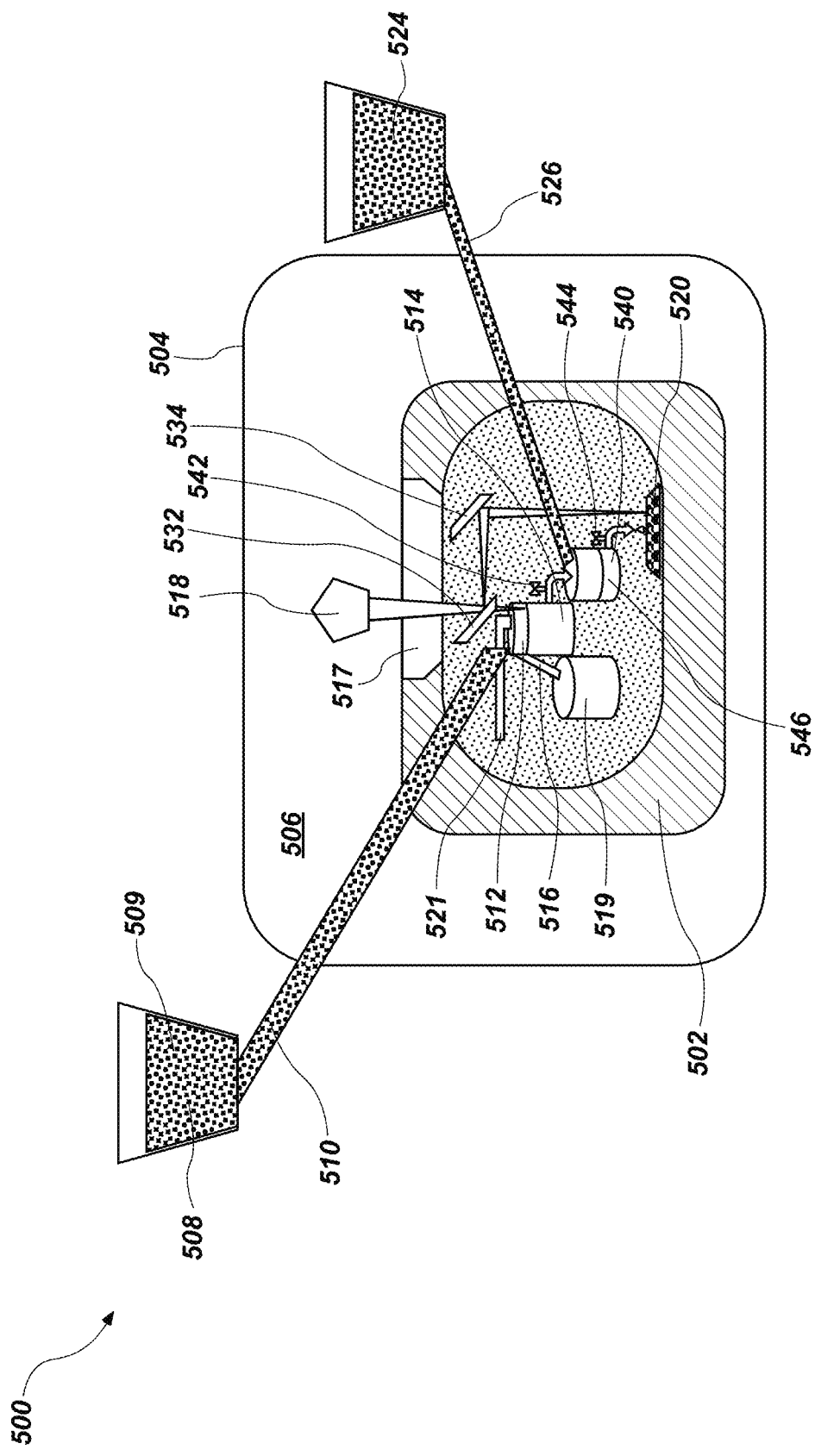
FIG. 5A is a simplified schematic illustrating a system for additively manufacturing a structure with in situ formed additive manufacturing materials, according to other embodiments of the disclosure.

FIG. 5A is a simplified schematic illustrating a system 500 for additively manufacturing a structure with in situ formed additive manufacturing materials, according to other embodiments of the disclosure. The system 500 may include a reaction vessel 502 surrounded by an outer enclosure 504. A volume 506 between the outer enclosure 504 and the reaction vessel 502 may be filled with a gas, such as oxygen, carbon monoxide, carbon dioxide, an inert gas (e.g., argon, nitrogen, helium, neon, etc.), water, or combinations thereof. A pressure of the reaction vessel 502 and the volume 506 may be less than atmospheric (e.g., vacuum), as described above with reference to the reaction vessel 102 and the volume 106 of FIG. 1A.

A feed material 508 may be contained within a feed tank 509 and in operable communication with the reaction vessel 502 via a feed conduit 510. The feed conduit 510 may be configured to dispose the feed material 508 on an upper surface of a reaction tank 512. In some embodiments, the feed material 508 may be provided to the reaction vessel 502 through an atomizer nozzle, which may be configured to heat the feed material 508 as it is provided to the reaction vessel 502. In some embodiments, the feed material 508 is melted as it is provided to the reaction vessel 502.

In some embodiments, the reaction tank 512 includes a stirrer configured to stir the materials within the reaction tank 512. Although FIG. 5A illustrates the feed material 508 and the feed tank 509 as being disposed outside of the outer enclosure 504, the disclosure is not so limited. In other embodiments, the feed material 508 and the feed tank 509 may be disposed within the volume 506 and the outer enclosure 504.

An energy source 518 (e.g., a laser, an electron beam, etc.) may be configured to provide sufficient energy to initiate a reaction between components of the feed material 508 in the reaction tank 512. Energy from the energy source 518 may be provided to the reaction tank 512 through a transparent window 517, such as a laser transparent window. Reaction of the components of the feed material 508 may form a liquid reaction product and a liquid reaction by-product. The reaction product and the reaction by-product may be separated based on a difference in one or more of a density, a solubility, or at least another property. A first liquid 516 (e.g., a less dense liquid) may comprise a reaction by-product and may be referred to herein as a floating slag. The first liquid 516 may overflow the reaction tank 512 into a reaction by-product tank 519. In some embodiments, a skimmer 521 may be configured to skim an upper surface of the reaction tank 512 and direct the reaction by-product to the reaction by-product tank 519. The first liquid 516 may be removed from the reaction by-product tank 519 and stored or reacted in another process.

A second liquid 514 may comprise the reaction product. The second liquid 514 may be fed from a lower portion of the reaction tank 512 to a second tank 540 through a valve 542. A reactant material 524 may be disposed into the second tank 540 through a reactant material conduit 526. The reactant material 524 may be formulated and configured to react with the reaction product (e.g., the second liquid 514) to form an additive manufacturing material 546. In some embodiments, the additive manufacturing material 546 comprises a liquid. The second tank 540 may be configured to be heated from an external source. In some embodiments, the energy source 518 or another energy source (e.g., another laser, electron beam, etc.) may be configured to provide energy to the second tank 540 to provide sufficient energy to initiate a reaction between the reactant material 524 and the reaction product.

The additive manufacturing material 546 may be provided to a substrate 520 through a valve 544 operably coupled to the second tank 540. The valve 544 may be configured to provide the additive manufacturing material 546 to the substrate 520 in the form of individual droplets. In some embodiments, the substrate 520 may be configured to move relative to the second tank 540. By way of nonlimiting example, in some embodiments, the substrate 420 may be disposed on a movable table or stage configured to move the substrate 520 relative to the second tank 540.

The energy source 518 may be configured to provide energy to the additive manufacturing material 546 on the substrate 520. In some embodiments, the energy may be transmitted through a set of mirrors. A first mirror 532 may be configured to transmit energy from the energy source 518 to a surface of the reaction tank 512 and may be further configured to transmit at least a portion of the energy to a second mirror 534. The second mirror 534 may be configured to direct the energy to the surface of the substrate 520. In some such embodiments, the surface of the reaction tank 512 and the substrate 520 may be exposed to the energy from the energy source 518 at substantially the same time. In other embodiments, the energy may be transmitted from a first energy source 318 and a second energy source, as described above with reference to FIG. 3A.

Responsive to exposure to the energy from the energy source 518, inter-granular bonds may form between adjacent particles of the additive manufacturing material 546 to form a layer of a structure comprising the additive manufacturing material 546. In some embodiments, the system 500 may be configured to operate substantially continuously. By way of nonlimiting example, the feed material 508 may be provided to the reaction tank 512 at substantially the same time as the additive manufacturing material 546 is provided to the substrate 520 and exposed to energy from the energy source 518.

In some embodiments, the system 500 may include a heater, a cooler, or both configured to respectively heat or cool the feed material 508, the reaction tank 512, the second tank 540, the substrate 520, or combinations thereof during use and operation of the system 500.

Figure 5B:
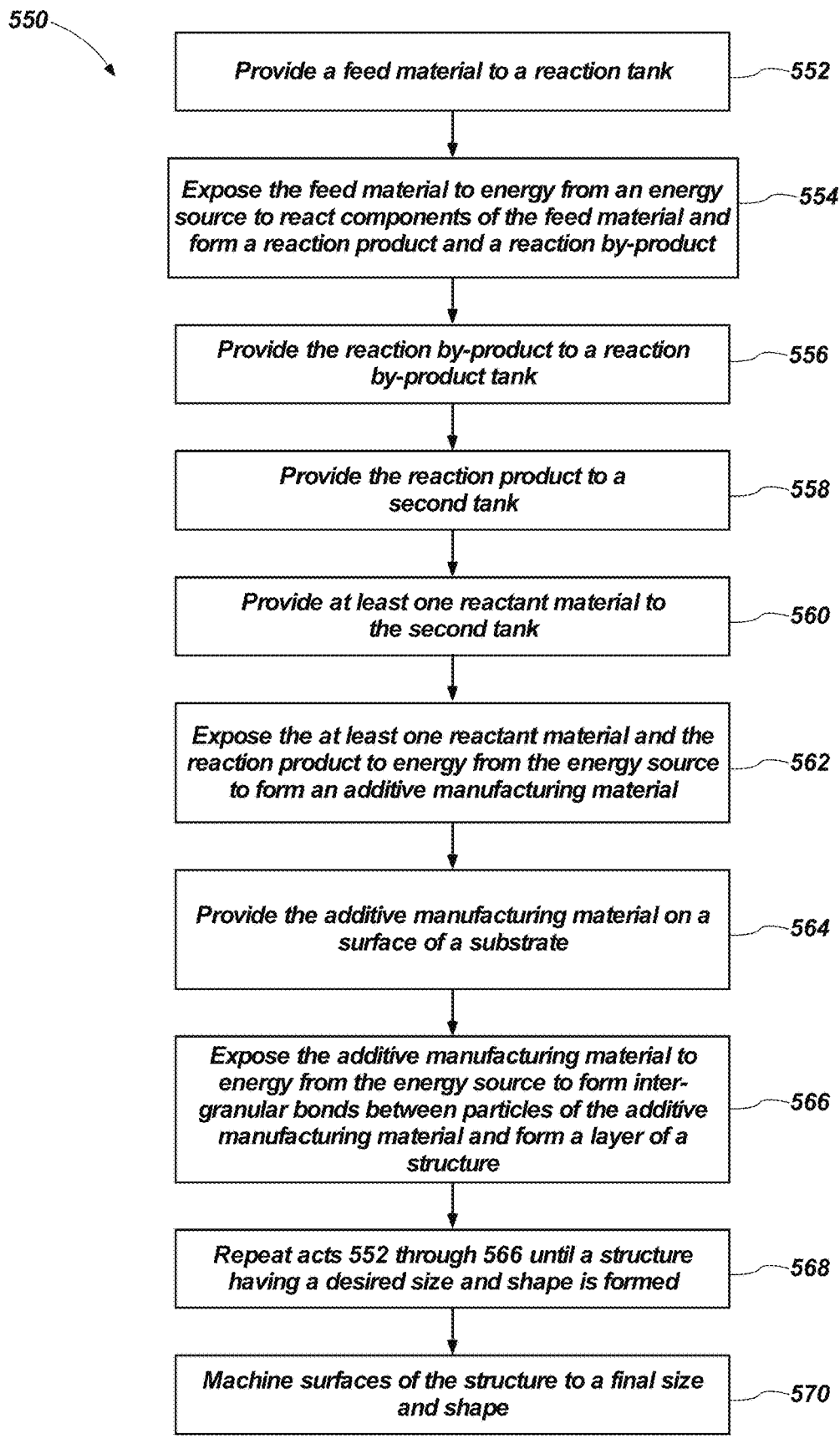
FIG. 5B is a flow diagram illustrating a method of additively manufacturing a material, according to embodiments of the disclosure.

FIG. 5B is a simplified schematic illustrating a method 550 of additively manufacturing a structure, according to embodiments of the disclosure. The method 550 includes act 552 including providing a feed material to a reaction tank; act 554 including exposing the feed material to energy from an energy source to react components of the feed material and form a reaction product and a reaction by-product; act 556 including providing the reaction by-product to a reaction by-product tank; act 558 including providing the reaction product to a second tank; act 560 including providing at least one reactant material to the second tank; act 562 including exposing the at least one reactant material and the reaction product to energy from the energy source to form an additive manufacturing material; act 564 including providing the additive manufacturing material to a substrate; act 566 including exposing the additive manufacturing material to energy from the energy source to form inter-granular bonds between particles of the additive manufacturing material and form a layer of a structure; act 568 including repeating acts 552 through 566 until a structure having a desired size and shape is formed; and act 570 including machining surfaces of the structure to a final size and shape.

With reference to FIG. 5A and FIG. 5B, act 552 includes providing the feed material 508 to the reaction tank 512. The feed material 508 may include a first component including at least one of uranium tetrafluoride and uranium hexafluoride, and a second component including at least one of one or more lanthanides, one or more semimetals, and one or more actinides. In other embodiments, the feed material 508 may include another fluoride, such as one or more of zirconium tetrafluoride, hafnium tetrafluoride, thorium tetrafluoride, cerium tetrafluoride, plutonium fluoride, palladium fluoride, neodymium fluoride, cerium fluoride, praseodymium fluoride, lanthanum fluoride. The feed material 508 may comprise a powder, granules, an ore, a solid material, or another structure, as described above with reference to the feed material 108 (FIG. 1A).

Act 554 includes exposing the feed material 508 to energy from the energy source 518 to react the components of the feed material 508 and form a reaction product and a reaction by-product. Reaction of the components of the feed material 508 may be substantially similar to the reactions described above with reference to Equation (15) and Equation (16).

Act 556 includes providing the reaction by-product to the reaction by-product tank 519. In some embodiments, the reaction by-product may overflow from the reaction tank 512 and into the reaction by-product tank 519. In some embodiments, the skimmer 521 may skim an upper surface of the reaction tank 512 and direct the reaction by-product to the reaction by-product tank 519.

Act 558 includes providing the reaction product to the second tank 540. The reaction product may be provided to the second tank 540 through a valve 542 that may be configured to control a flow of the reaction product to the second tank 540.

Act 560 includes providing the at least one reactant material 524 to the second tank 540. The at least one reactant material may include at least one of silicon, molybdenum, aluminum, and a carbon-containing material (e.g., one or more of graphite, carbon black, etc.).

Act 562 includes exposing the at least one reactant material and the reaction product to energy from the energy source 518 to chemically react the reaction product and the at least one reactant material and form an additive manufacturing material, as described above with reference to Equations (17) through (20). The energy source 518 may be configured to provide sufficient energy to initiate a reaction between the at least one reactant material and the reaction product. In some embodiments, the additive manufacturing material may be formed in a liquid phase.

Act 564 includes providing the additive manufacturing material on a surface of the substrate 520. The additive manufacturing material may be provided to the surface of the substrate 520 through a valve 544. In some embodiments, the additive manufacturing material may be provided to the substrate as individual droplets of liquid.

Act 566 includes exposing the additive manufacturing material to energy from the energy source to form inter-granular bonds between particles of the additive manufacturing material and to form a layer of a structure. In some embodiments, responsive to being disposed on the substrate 520, the additive manufacturing material may cool and solidify. Responsive to exposure to energy from the energy source 518, particles of the additive manufacturing material may form inter-granular bonds with adjacent particles to form a layer of a structure. The energy source 518 may be configured to move relative to the substrate 520 to expose a predetermined pattern of the additive manufacturing material to the energy.

Act 568 includes repeating acts 552 through 564 until a structure having a desired size and shape is formed. By way of nonlimiting example, act 568 may include providing the feed material 508 to the reaction tank 512, exposing the feed material 508 to energy to react components thereof and form a reaction product and a reaction by-product, providing the reaction by-product to the reaction by-product tank 519, providing the reaction product to the second tank 540, providing the at least one reactant material 524 to the second tank 540, exposing the at least one reactant material 524 and the reaction product to energy to form an additive manufacturing material, providing the additive manufacturing material to a surface of the substrate 520, and exposing the additive manufacturing material to energy to form inter-granular bonds between particles of the additive manufacturing material and underlying layers of the structure.

In some embodiments, substantially all acts of the method 550 may be performed simultaneously. For example, energy from the energy source 518 may be configured to be directed to the reaction tank 512, the second tank 540, and the substrate 520 due to the first mirror 532 and the second mirror 534 (or energy may be transmitted from a first energy source 318 to the reaction tank 512 and from a second energy source 328 to the substrate 520, as described above with reference to FIG. 3A). Accordingly, the feed material 508 may be continuously provided to the reaction tank 512, while the feed material 508 in the reaction tank 512 is exposed to the energy. At the same time, the reaction product may be provided to the second tank 540 and the at least one reactant material 524 may be reacted with the reaction product to form the additive manufacturing material. The additive manufacturing material may be substantially continuously disposed on the substrate 520 and surfaces of previously formed layers of the structure and exposed to the energy to additively manufacture the structure.

Act 568 includes machining surfaces of the structure to a final size and shape may be substantially similar to act 164 described above with reference to FIG. 1B. Accordingly, a structure may be additively manufactured by reacting a plurality of feed materials to form an additive manufacturing material in situ and exposing the additive manufacturing material to energy to form a layer of a structure.

In some embodiments, act 570 may include heat treating the structure. By way of nonlimiting example, the structure may be exposed to annealing conditions, such as temperature greater than about 400° C., greater than about 600° C., greater than about 800° C., greater than about 1,000° C., or even greater than about 1,500° C. for a duration between about one minute and about twenty-four hours, such as between about one minute and about thirty minutes, between about thirty minutes and about one hour, between about one hour and about two hours, between about two hours and about four hours, between about four hours and about eight hours, between about eight hours and about twelve hours, or between about twelve hours and about twenty-four hours.

Figure 6A:
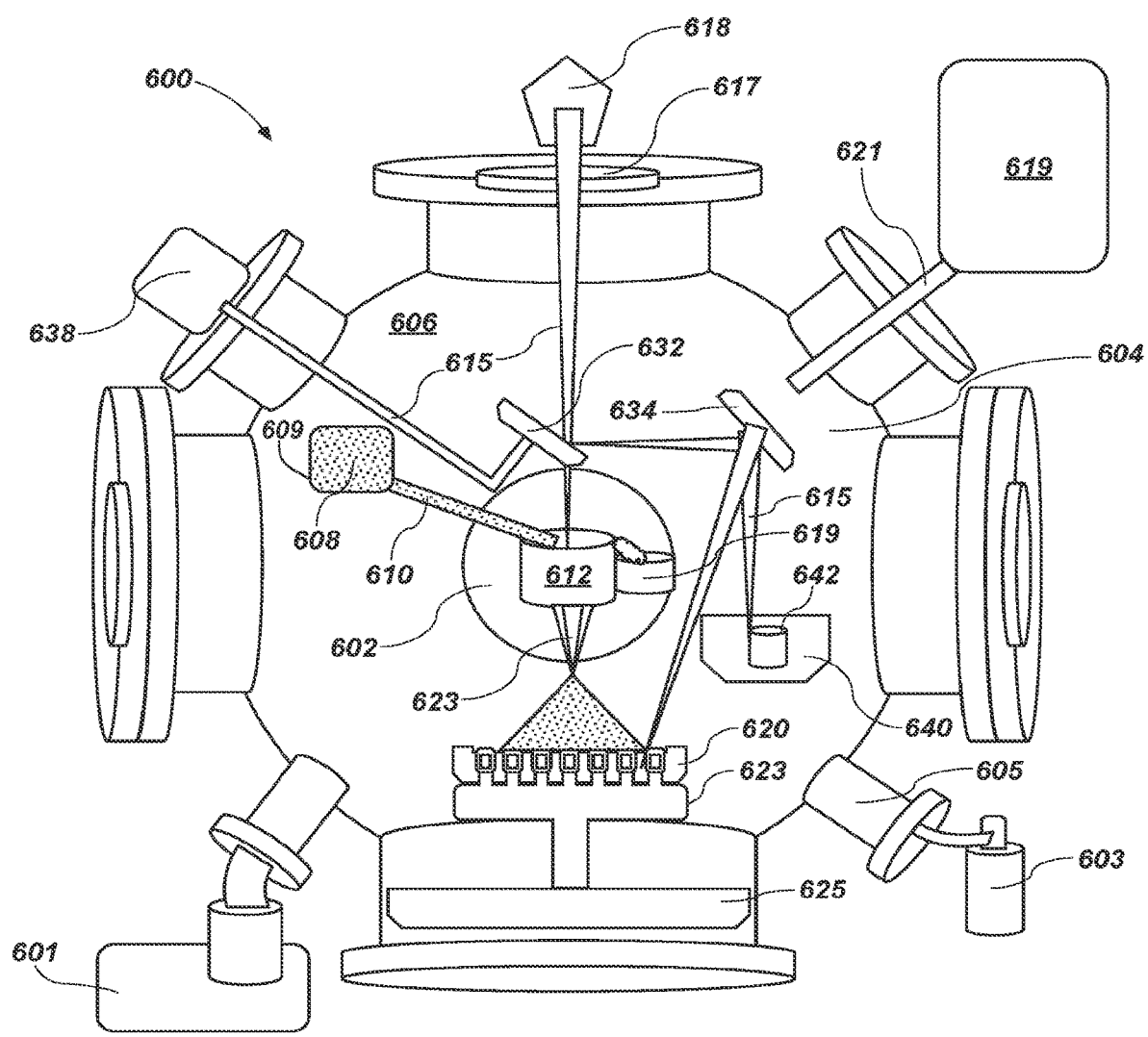
FIG. 6A is a simplified schematic illustrating a system for additively manufacturing a structure with in situ formed additive manufacturing materials, according to further embodiments of the disclosure.

FIG. 6A is a simplified schematic of a system 600 for additively manufacturing a structure with in situ formed additive manufacturing materials, according to other embodiments of the disclosure. The system 600 may include a reaction vessel 602, which may be surrounded by an outer enclosure 604. A volume 606 between the outer enclosure 604 and the reaction vessel 602 may be filled with a gas provided from a gas source 603. The gas source 603 may comprise, for example, oxygen, carbon monoxide, carbon dioxide, an inert gas (e.g., argon, nitrogen, helium, neon, etc.), water, or combinations thereof. The gas may be provided to the reaction vessel 602 via a gas inlet 605. A pressure of the reaction vessel 602 may be less than atmospheric (e.g., vacuum), as described above with reference to the reaction vessel 102 of FIG. 1A. For example, the system 600 may include a vacuum system 601 configured to maintain a desired pressure (e.g., a vacuum pressure) within the system, such as within the volume 606 defined by the outer enclosure 604 and within the reaction vessel 602.

A feed material 608 may be provided to the reaction vessel 602 through a feed conduit 610 in operable communication with the reaction vessel 602. The feed conduit 610 may be configured to dispose the feed material 608 on an upper surface of a reaction tank 612. The feed material 608 may be stored in a feed tank 609. In some embodiments, the feed tank 609 may be in operable communication with a crushing stage configured to provide the feed material 608 in powder form to the feed tank 609.

The reaction tank 612 may include a stirrer configured to stir the materials within the reaction tank 612. Although FIG. 6A illustrates the feed material 608 and the feed tank 609 as being disposed outside of the outer enclosure 604, the disclosure is not so limited. In other embodiments, the feed material 608 and the feed tank 609 may be disposed within the volume 606 and the outer enclosure 604.

An energy source 618 (e.g., a laser, an electron beam, etc.) may be configured to provide sufficient energy (represented by line 615) to initiate a reaction between components of the feed material 608 in the reaction tank 612. Energy from the energy source 618 may be provided to the reaction tank 612 through a transparent window 617, such as a laser transparent window. Reaction of the components of the feed material 608 may form a reaction product (e.g., a solid reaction product, a liquid reaction product, and/or a gaseous reaction product) and a liquid reaction by-product (e.g., a solid reaction by-product, a liquid reaction by-product, and/or a gaseous reaction by-product). The reaction product and the reaction by-product may be separated based on a difference in one or more of a density, a solubility, or at least another property.

In some embodiments, a first liquid (e.g., a less dense liquid) may comprise a reaction by-product and may be referred to herein as a floating slag. The reaction by-product may overflow the reaction tank 612 into a reaction by-product tank 619. In some embodiments, a skimmer, such as the skimmer 521 described above with reference to FIG. 5A, may be configured to skim an upper surface of the reaction tank 612 and direct the reaction by-product to the reaction by-product tank 619. The reaction by-product may be removed from the reaction by-product tank 619 and stored or reacted in another process.

The reaction by-product tank 619 may be operable communication with the reaction tank 612 and the outer enclosure 604 through a reaction by-product conduit 621. In some embodiments, the reaction by-product tank 619 may comprise a gas filter configured to remove reaction by-product gases generated during exposure of the feed material 608 to energy from the energy source 618. In other embodiments, the reaction by-product tank 619 comprises a recombination and scrubbing tank, such as the reaction by-product vessel 224 described above with reference to FIG. 2A.

The reaction product in the reaction tank 612 may be removed therefrom through, for example, an atomizer nozzle 623. The atomizer nozzle 623 may be configured to provide the reaction product to a substrate 620. In some embodiments, the atomizer nozzle 623 may be configured to heat the reaction product as it is provided to the substrate 620. A reactant material may be provided to the substrate 620, such as through a reactant material conduit, similar to the reactant material conduit 526 described above with reference to FIG. 5A. In some embodiments, the substrate 620 may be in operable communication with the crushing stage, which may be configured to provide the reactant material to the substrate 620. The reactant material may be formulated and configured to react with the reaction product (provided to the substrate 620 through the atomizer nozzle 623) to form an additive manufacturing material. In some embodiments, the substrate 620 is disposed on an additive manufacturing stage 623, which may be configured to vibrate to substantially mix the additive manufacturing material and facilitate exposure thereof to energy from the energy source 618. In some embodiments, the additive manufacturing stage 623 is configured to heat the substrate 620 and the additive manufacturing material disposed thereon. The system 600 may further include a plate 625 positioned and configured to receive (e.g., catch) materials that fall from the substrate 620. Material from the plate 625 may be returned to, for example, the feed tank 609.

The additive manufacturing material on the substrate 620 may be exposed to energy from the energy source 618 to form inter-granular bonds between the particles of the additive manufacturing material and form a structure. In some embodiments, the system 600 includes one or more mirrors 632, 634 configured to direct energy from the energy source 618 to the substrate 620. A second energy source 638 may be configured to provide energy (represented as line 615) to the substrate 620 through at least one of the mirrors 632, 634.

In some embodiments, the system 600 further includes a post-fabrication stage 640 configured for treating the structure formed by additive manufacturing. The post-fabrication stage 640 may be configured to heat (e.g., anneal), machine, or both the structure formed by additive manufacturing to a final structure 642 having a desired size, shape, and material properties. By way of nonlimiting example, the post-fabrication stage may be configured to be exposed to energy from one or both of the energy sources 618, 638 to subtractively machine at least a portion of the structure. In some embodiments, a conveyer or other transport means operably couples the post-fabrication stage 640 with the substrate 620 and the additive manufacturing stage 623.

Figure 6B:
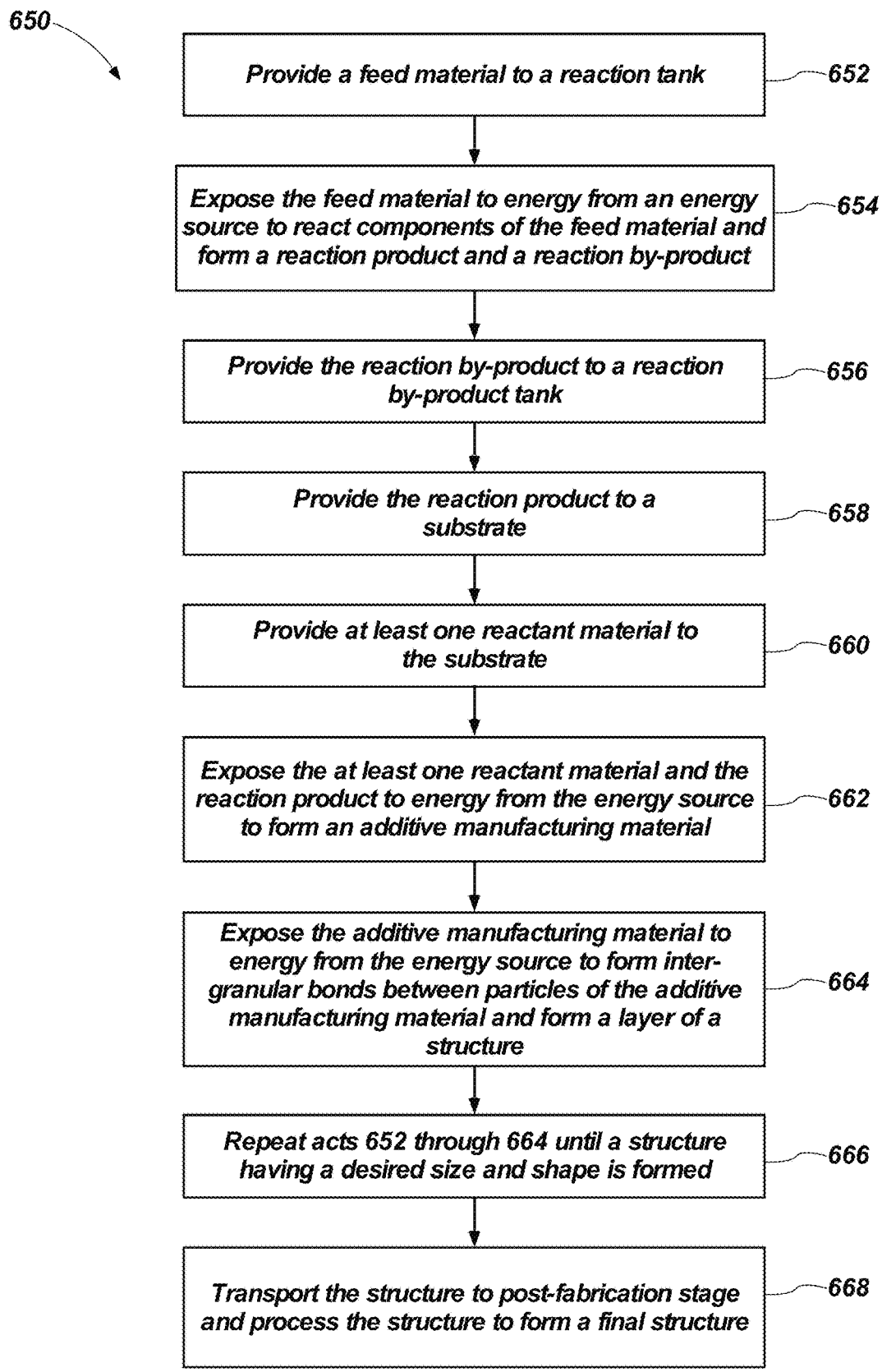
FIG. 6B is a flow diagram illustrating a method of additively manufacturing a material, according to embodiments of the disclosure.

FIG. 6B is a simplified schematic illustrating a method 650 of additively manufacturing a structure, according to embodiments of the disclosure. The method 650 includes act 652 including providing a feed material to a reaction tank; act 654 including exposing the feed material to energy from an energy source to react components of the feed material and form a reaction product and a reaction by-product; act 656 including providing the reaction by-product to a reaction by-product tank; act 658 including providing the reaction product to a substrate; act 660 including providing at least one reactant material to the substrate; act 662 including exposing the at least one reactant material and the reaction product to energy from the energy source to form an additive manufacturing material; act 664 including exposing the additive manufacturing material to energy from the energy source to form inter-granular bonds between particles of the additive manufacturing material and form a layer of a structure; act 666 including repeating acts 552 through 664 until a structure having a desired size and shape is formed; and act 668 including transporting the structure to a post-fabrication stage and processing the structure to form a final structure.

With reference to FIG. 6A and FIG. 6B, act 652 includes providing the feed material 608 to the reaction tank 612. In some embodiments, the feed material 608 may include a first component including at least one of uranium tetrafluoride and uranium hexafluoride, and a second component including at least one of one or more lanthanides, one or more semimetals, and one or more actinides. However, the disclosure is not so limited and the feed material 608 may include other materials, such as, for example, one or more of zirconium tetrafluoride, hafnium tetrafluoride, thorium tetrafluoride, cerium tetrafluoride, plutonium fluoride, palladium fluoride, neodymium fluoride, cerium fluoride, praseodymium fluoride, lanthanum fluoride, zirconium oxide, hafnium oxide, thorium oxide, cerium oxide, plutonium oxide, palladium oxide, neodymium oxide, praseodymium oxide, lanthanum oxide, another material, and combinations thereof. The feed material 608 may comprise a powder, granules, an ore, a solid material, or another structure, as described above with reference to the feed material 108 (FIG. 1A).

Act 654 includes exposing the feed material 608 to energy from the energy source 618 to react the components of the feed material 608 and form a reaction product and a reaction by-product.

Act 656 includes providing the reaction by-product to the reaction by-product tank 619. In some embodiments, the reaction by-product may overflow from the reaction tank 612 and into the reaction by-product tank 619. In some embodiments, the skimmer may skim an upper surface of the reaction tank 612 and direct the reaction by-product to the reaction by-product tank 619.

Act 658 includes providing the reaction product to the substrate 620. The reaction product may be provided to the substrate 620 through the atomizer nozzle 623 that may be configured to control a flow and temperature of the reaction product to the substrate 620.

Act 660 includes providing the at least one reactant material to the substrate 620. In some embodiments, the at least one reactant material may include at least one of silicon, molybdenum, aluminum, and a carbon-containing material (e.g., one or more of graphite, carbon black, etc.). However, the disclosure is not so limited and the at least one reactant material may include other materials.

Act 662 includes exposing the at least one reactant material and the reaction product to energy from the energy source 618 to chemically react the reaction product and the at least one reactant material and form an additive manufacturing material, as described above with reference to, for example, Equations (17) through (20). The energy source 618 may be configured to provide sufficient energy to initiate a reaction between the at least one reactant material and the reaction product. However, the disclosure is not so limited and the reaction may be different from those described above with reference to Equations (17) through (20).

Act 664 includes exposing the additive manufacturing material to energy from the energy source to form inter-granular bonds between particles of the additive manufacturing material and to form a layer of a structure. Responsive to exposure to energy from the energy source 618 (and/or 638), particles of the additive manufacturing material may form inter-granular bonds with adjacent particles to form a layer of a structure. The energy source 618 may be configured to move relative to the substrate 620, the additive manufacturing stage 623, or both, to expose a predetermined pattern of the additive manufacturing material to the energy.

Act 666 includes repeating acts 652 through 664 until a structure having a desired size and shape is formed. By way of nonlimiting example, act 666 may include providing the feed material 608 to the reaction tank 612, exposing the feed material 608 to energy to react components thereof and form a reaction product and a reaction by-product, providing the reaction by-product to the reaction by-product tank 619, providing the reaction product to the substrate 620, providing the at least one reactant material to the substrate 620, exposing the at least one reactant material and the reaction product to energy to form an additive manufacturing material, and exposing the additive manufacturing material to energy to form inter-granular bonds between particles of the additive manufacturing material and underlying layers of the structure.

In some embodiments, substantially all acts of the method 650 may be performed simultaneously. For example, energy from the energy source 618 may be configured to be directed to the reaction tank 612 and the substrate 620 due to the mirrors 632 and the second mirror 634 and/or the additional energy source 638. Accordingly, the feed material 608 may be continuously provided to the reaction tank 612, while the feed material 608 in the reaction tank 612 is exposed to the energy. At the same time, the reaction product may be provided to the substrate 620 and the at least one reactant material may be reacted with the reaction product to form the additive manufacturing material. The additive manufacturing material may be substantially continuously disposed on the substrate 620 and surfaces of previously formed layers of the structure and exposed to the energy to additively manufacture the structure.

Act 668 may include transporting the structure to a post-fabrication stage and processing the structure to form a final structure. In some embodiments, the structure may be transported from the substrate 620 to the post-fabrication stage 640. The structure may be exposed to energy to shape the final structure 642, may be machined, or both.

Accordingly, the systems and methods described herein may facilitate forming one or more structures from additive manufacturing materials formed in situ in a reaction chamber comprising the additive manufacturing tool. Multiple chemical reactions may be tailored to form a desired additive manufacturing material from one or more feed materials and reactants. By way of nonlimiting example, nuclear fuel materials comprising uranium may be fabricated from a plurality of different uranium-containing feed materials, such as uranium tetrafluoride, uranium hexafluoride, uranium oxide, uranium dioxide, or depleted uranium fuels. In some embodiments, the uranium fuel materials may be fabricated from a feed material that does not comprise or consist essentially of elemental uranium. The methods described herein may be used to form uranium-molybdenum fuels, such as monolithic structures comprising uranium-molybdenum. In other embodiments, the methods may be used to form cermet fuels, such as uranium-aluminum alloys (e.g., uranium dispersed within an aluminum matrix material). It is contemplated that in other embodiments, the methods may be used to form nuclear reactor control rod materials (e.g., hafnium-based alloys and compounds), neutron reflectors (e.g., $Zr_3Si_2$), wear resistance materials (e.g., $Hf_3Si_2$), uranium aluminide-aluminum alloys, metal carbides (e.g., uranium carbide, zirconium carbide, hafnium carbide, thorium carbide, cerium carbide, plutonium carbide, palladium carbide, neodymium carbide, praseodymium carbide, lanthanum carbide), molybdenum alloys (e.g., uranium-molybdenum alloys, metal-molybdenum alloys wherein the metal includes at least one of zirconium, hafnium, thorium, cerium, plutonium, palladium, neodymium, praseodymium, lanthanum, or combinations thereof), aluminum alloys (e.g., uranium-aluminum alloys, metal-aluminum alloys wherein the metal includes at least one of zirconium, hafnium, thorium, cerium, plutonium, palladium, neodymium, praseodymium, lanthanum, or combinations thereof), semiconducting materials (e.g., $Ce_3Si_2$), glass-ceramic scintillators or luminescent materials in ultraviolet and vacuum ultraviolet regions (e.g., $CeF_3$), fluorescent materials (e.g., $LaF_3$), anti-reflection coatings on optical components in the ultraviolet spectrum (e.g., $AlF_3$, $LaF_3$, etc.), and ionic conductors (e.g., $SiF_4$). In other embodiments, the methods may be used to form components of molten salt reactors (e.g., fuel materials comprising thorium sesquisilicide).

Similarly, in some embodiments, one or more of uranium-zirconium (U—Zr) alloys, uranium-plutonium-zirconium (U—Pt—Zr alloys), uranium-zirconium-palladium (U—Zr—Pd) alloys, uranium-zirconium-palladium-neodymium (U—Zr—Pd—Nd) alloys, uranium-zirconium-palladium-cerium (U—Zr—Pd—Ce) alloys, uranium-zirconium-palladium-praseodymium (U—Zr—Pd—Pr) alloys, or uranium-zirconium-palladium-lanthanum (U—Zr—Pd—La) alloys may be formed according to the methods described herein. The alloys may be formed to exhibit a desired atomic percent of each component thereof (i.e., each of uranium, plutonium, zirconium, palladium, neodymium, cerium, praseodymium, lanthanum, etc.) based on the composition of the feed material. Each metal may be formed in situ according to the methods described herein. After formation of the metals in situ, the metals may be exposed to energy from the energy source to form the alloys.

Although the systems and methods have been described as being used to additively manufacture specific materials, the disclosure is not so limited. The systems and methods described herein may be used to form any additive manufacturing material from feed materials as long as a controllable reaction between the feed materials to form the additive manufacturing material is thermodynamically possible.

The materials formed according to the embodiments described herein may exhibit substantially uniform properties, at least due to the ability to form localized melt pools of material at desired locations of a structure being additively manufactured. In some embodiments, materials formed according to the methods described herein may exhibit a higher density than similar materials formed by other methods, such as extrusion or sintering. Without wishing to be bound by any particular theory, it is believed that the increased density is due to the local size of the area that is exposed to the energy to form a localized melt pool and an area to be additively manufactured. In addition, the structure may be formed without a binder material, further increasing a density of the structure.

In some embodiments, the methods described herein may be used to form a fuel material comprising uranium from feed materials comprising uranium (e.g., low grade uranium materials, such as spent nuclear fuels). The fuel materials may be used in a breeder nuclear reactor core for a sufficient period of time until they become depleted. The depleted fuels may be used as a feed material in the methods described herein. Accordingly, nuclear fuel materials may be recycled by using the methods described herein.

The additive manufacturing process may reduce a number of process acts to form a structure compared to extrusion or sintering processes. The process may be based on solid-solid reactions, solid-gas reactions, or liquid-liquid reactions.

EXAMPLES

Example 1

A powder comprising zirconium tetrafluoride was mixed with a powder comprising silicon to form zirconium silicide and silicon tetrafluoride, according to the reaction below:

$$3ZrF_4(s) + 5Si(s) \rightarrow Zr_3Si_2(s,l) + 3SiF_4(g)$$

The zirconium tetrafluoride powder and the silicon powder were provided to a reaction vessel similar to the reaction vessel described above with reference to FIG. 1A. The mixed powder was exposed to energy from an energy source to form the $Zr_3Si_2$ and $SiF_4$ product. The pressure of the reaction vessel was maintained at about 20 mTorr during the reaction. The resulting $Zr_3Si_2$ structure included a secondary phase of ZrSi.

Example 2

Hafnium powder and silicon powder were provided to a reaction vessel similar to the reaction vessel described above with reference to FIG. 1A. It is contemplated that the hafnium could have been formed in situ in the reaction vessel from a powder comprising, for example, hafnium fluoride (e.g., hafnium tetrafluoride). The hafnium powder and the silicon powder were exposed to energy from an energy source to form a structure. The structure included hafnium and silicon and, in particular, included HfSi, $Hf_3Si_2$, $Hf_5Si_3$. The atomic ratio of silicon and hafnium at multiple regions of the structure was measured, the results of which are reproduced in Table I below.

TABLE I

| Location | Hafnium (at. %) | Silicon (at. %) |
|---|---|---|
| 1 | 57.95 | 42.05 |
| 2 | 56.13 | 43.87 |
| 3 | 61.03 | 38.97 |

Figure 7A:
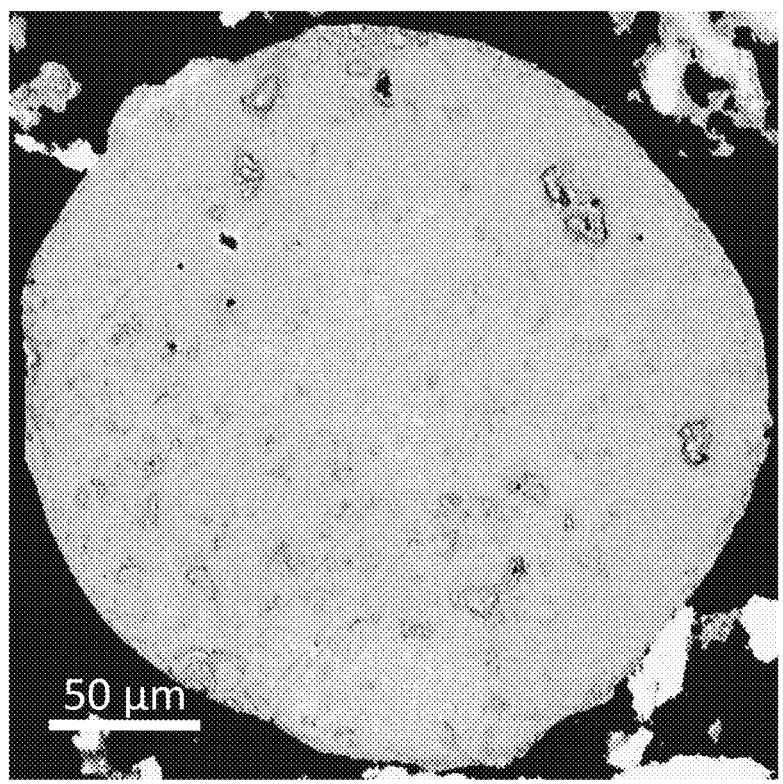
FIG. 7A and FIG. 7B are scanning electron microscope images of a structure formed, according to embodiments of the disclosure.
Figure 7B:
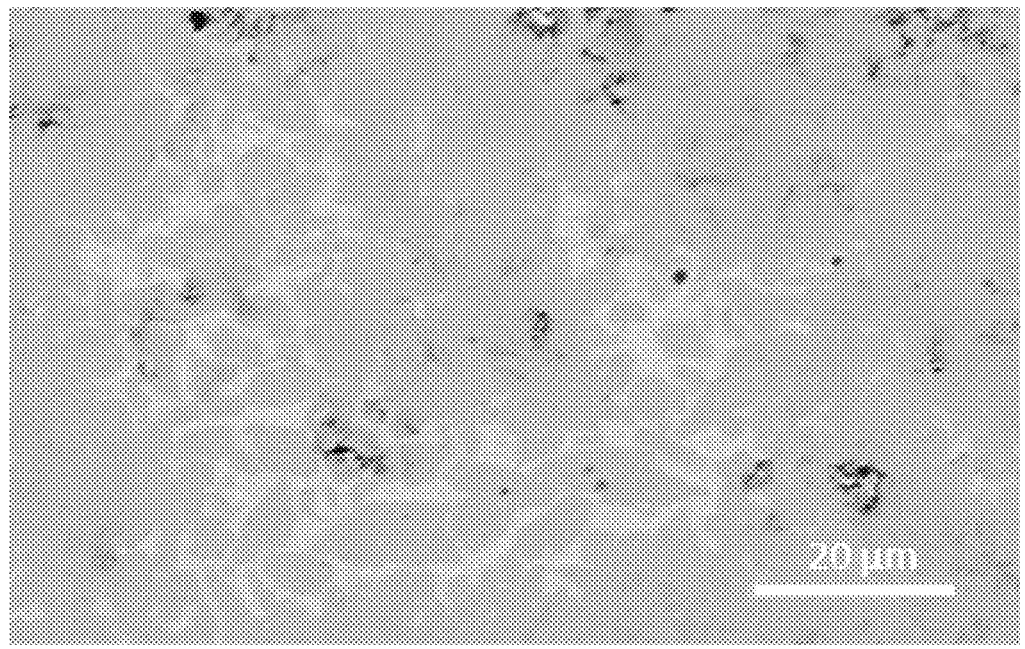

FIG. 7A and FIG. 7B are scanning electron microscope images of the structure including hafnium and silicon. The silicon and hafnium were inhomogeneously distributed throughout the structure.

Zirconium powder and silicon powder were provided to a reaction vessel similar to the reaction vessel described above with reference to FIG. 1A. It is contemplated that the hafnium could have been formed in situ in the reaction vessel from a powder comprising, for example, zirconium fluoride (e.g., zirconium tetrafluoride). The zirconium powder and the silicon powder were exposed to energy from an energy source to form a structure. The structure included zirconium and silicon and, in particular, included ZrSi, $ZrSi_2$, $Zr_3Si_2$, $Zr_2Si$, and Si. The atomic ratio of silicon and zirconium at multiple regions of the structure was measured, the results of which are reproduced in Table II below.

TABLE II

| Location | Hafnium (at. %) | Silicon (at. %) |
|---|---|---|
| 1 | 59.00 | 41.00 |
| 2 | 58.98 | 41.02 |
| 3 | 59.09 | 40.91 |

As shown in Table II, the composition of the structure was substantially uniform throughout the structure.

While embodiments of the disclosure may be susceptible to various modifications and alternative forms, specific embodiments have been shown by way of example in the drawings and have been described in detail herein. However, it should be understood that the disclosure is not limited to the particular forms disclosed. Rather, the disclosure encompasses all modifications, variations, combinations, and alternatives falling within the scope of the disclosure as defined by the following appended claims and their legal equivalents.

What is claimed is:

1. A method of additively manufacturing a structure, the method comprising:
    disposing a feed material comprising uranium tetrafluoride on a surface of a substrate in a reaction vessel;
    disposing a silicon-containing compound formulated and configured to react with the uranium tetrafluoride in the reaction vessel;
    exposing the uranium tetrafluoride and the silicon-containing compound to energy from an energy source to react the uranium tetrafluoride and the silicon-containing compound to form an additive manufacturing material comprising uranium silicide and reaction by-products;
    separating the uranium silicide from the reaction by-products; and
    exposing the uranium silicide to energy from the energy source to form inter-granular bonds between particles of the uranium silicide and form a layer of a structure comprising the uranium silicide.

2. A method of additively manufacturing a uranium-containing nuclear fuel material from a uranium material, the method comprising:
    disposing at least one uranium-containing material selected from the group consisting of uranium tetrafluoride, uranium hexafluoride, depleted uranium, uranium dioxide, and uranium oxide ($U_3O_8$) in a reaction vessel to form a first layer of the at least one uranium-containing material in the reaction vessel;
    disposing at least one reactant material selected from the group consisting of an alkali metal, silicon, a silicon-containing compound, carbon monoxide, water, a lanthanide, an actinide, or a semimetal proximate the at least one uranium-containing material;
    exposing the at least one uranium-containing material and the at least one reactant material to energy from an energy source to form uranium metal, uranium silicide, or uranium oxide;
    exposing the uranium metal, uranium silicide, or uranium oxide to energy from the energy source to form a first layer of a structure;
    disposing the at least one uranium-containing material on the first layer of the structure;
    disposing the at least one reactant material proximate the at least one uranium-containing material on the first layer to form a second layer of the at least one uranium-containing material and the at least one reactant material;
    exposing the second layer of the at least one uranium-containing material and the at least one reactant material to energy from the energy source to form uranium metal, uranium silicide, or uranium oxide; and
    exposing the uranium metal, uranium silicide, or uranium oxide to energy from the energy source to form a second layer of the structure over the first layer of the structure and form inter-granular bonds between the first layer and the second layer of the structure, wherein exposing the uranium metal, uranium silicide, or uranium oxide to energy from the energy source to form the first layer of the structure comprises providing a greater power from the energy source than a power provided to expose the second layer of the at least one uranium-containing material and the at least one reactant material to energy.

3. The method of claim 2, further comprising:
selecting the at least one uranium-containing material to comprise uranium tetrafluoride or uranium hexafluoride; and
selecting the at least one reactant material to comprise an alkali metal.

4. The method of claim 2, further comprising:
selecting the at least one uranium-containing material to comprise uranium tetrafluoride or uranium hexafluoride; and
selecting the at least one reactant material to comprise a silicon boride, a silicon lanthanide, or a silicon-cerium material.

5. The method of claim 2, further comprising:
selecting the at least one uranium-containing material to comprise uranium tetrafluoride or uranium hexafluoride; and
selecting the at least one reactant material to comprise water.

6. The method of claim 2, further comprising:
selecting the at least one uranium-containing material to comprise uranium oxide or uranium dioxide; and
selecting the at least one reactant material to comprise carbon monoxide.

7. The method of claim 2, further comprising:
selecting the at least one uranium-containing material to comprise uranium tetrafluoride or uranium hexafluoride; and
selecting the at least one reactant material to comprise at least one of a lanthanide, a semimetal, and an actinide.

8. A method of additively manufacturing a structure with an in situ formed additive manufacturing material, the method comprising:
providing carbon monoxide and a feed material comprising at least one of uranium oxide or uranium dioxide in a reaction vessel;
exposing the carbon monoxide and the at least one of uranium oxide or uranium dioxide to energy from an energy source to form an additive manufacturing material comprising uranium metal to be used in an additive manufacturing process;
providing a layer of the uranium metal and at least one reactant material on a substrate; and
exposing the layer of the uranium metal and the at least one reactant material to energy from the energy source to form a layer of a structure.

9. The method of claim 8, further comprising exposing the uranium metal and one of silicon, molybdenum, aluminum, or a carbon-containing material to energy from the energy source to form uranium silicide, uranium-molybdenum, uranium-aluminum, or uranium carbide.

10. A method of additively manufacturing a structure, the method comprising:
disposing a feed material comprising uranium oxide on a surface of a substrate in a reaction vessel;
introducing carbon monoxide to the reaction vessel;
exposing the uranium oxide and the carbon monoxide to energy from an energy source to react the uranium oxide and the carbon monoxide to form uranium metal and carbon dioxide;
separating the uranium metal from the carbon dioxide; and
exposing the uranium metal to energy from the energy source to form inter-granular bonds between particles of the uranium metal and form a layer of a structure comprising the uranium metal.

11. A method of additively manufacturing a structure, the method comprising:
disposing a spent nuclear fuel on a surface of a substrate in a reaction vessel;
disposing at least one material formulated and configured to react with the spent nuclear fuel in the reaction vessel;
exposing the spent nuclear fuel and the at least one material to energy from an energy source to react the spent nuclear fuel and the at least one material to form an additive manufacturing material and reaction by-products;
separating the additive manufacturing material from the reaction by-products; and
exposing the additive manufacturing material to energy from the energy source to form inter-granular bonds between particles of the additive manufacturing material and form a layer of a structure comprising the additive manufacturing material.

12. A method of additively manufacturing a uranium-containing nuclear fuel material from a uranium material, the method comprising:
disposing at least one uranium-containing material selected from the group consisting of uranium tetrafluoride and uranium hexafluoride in a reaction vessel to form a first layer of the at least one uranium-containing material in the reaction vessel;
disposing at least one reactant material selected from the group consisting of a silicon boride, a silicon lanthanide, and a silicon-cerium material proximate at least one uranium-containing material;
exposing the at least one uranium-containing material and the at least one reactant material to energy from an energy source to form uranium silicide; and
exposing uranium silicide to energy from the energy source to form a first layer of a structure.

13. A method of additively manufacturing a uranium-containing nuclear fuel material from a uranium material, the method comprising:
disposing at least one uranium-containing material selected from the group consisting of uranium dioxide and uranium oxide ($U_3O_8$) in a reaction vessel to form a first layer of the at least one uranium-containing material in the reaction vessel;
disposing at least one reactant material comprising carbon monoxide proximate the at least one uranium-containing material;
exposing the at least one uranium-containing material and the at least one reactant material to energy from an energy source to form uranium metal; and
exposing the uranium metal to energy from the energy source to form a first layer of a structure.

* * * * *

UNITED STATES PATENT AND TRADEMARK OFFICE
CERTIFICATE OF CORRECTION

PATENT NO. : 11,014,265 B2  
APPLICATION NO. : 15/909505  
DATED : May 25, 2021  
INVENTOR(S) : Isabella J. van Rooyen and Clemente J. Parga Page 1 of 1

It is certified that error appears in the above-identified patent and that said Letters Patent is hereby corrected as shown below:

In the Specification

Column 24, Line 48, change "for additively, manufacturing" to --for additively manufacturing--

Signed and Sealed this  
Twenty-fourth Day of August, 2021

Drew Hirshfeld  
*Performing the Functions and Duties of the*  
*Under Secretary of Commerce for Intellectual Property and*  
*Director of the United States Patent and Trademark Office*